United States Patent [19]

Nakamura et al.

[11] Patent Number: 4,809,018

[45] Date of Patent: Feb. 28, 1989

[54] THERMAL TRANSFER PRINTER

[75] Inventors: Kenji Nakamura; Kenichi Hironaka; Nobuyuki Tottori; Junichi Matsumoto, all of Hitachi; Katsumi Imaizumi, Kitaibaraki; Syoji Yokoyama, Hitachi; Yukio Nakata, Kawasaki; Akira Nakajima, Tokyo; Yuuji Aoyagi; Tomohiko Yanagita, both of Hitachi; Tomio Sato, Takahagi; Tetsuji Takegoshi; Takeo Honma, both of Hitachi, all of Japan

[73] Assignee: Hitachi, Ltd., Tokyo, Japan

[21] Appl. No.: 8,353

[22] Filed: Jan. 29, 1987

[30] Foreign Application Priority Data

Jan. 29, 1986 [JP] Japan .................................. 61-15708

[51] Int. Cl.[4] .......................... G01D 15/10; E41J 3/20

[52] U.S. Cl. ............................... 346/76 PH; 400/120; 400/208; 400/208.4

[58] Field of Search .......................... 346/76 PH, 105; 400/208, 208.1, 120

[56] References Cited

U.S. PATENT DOCUMENTS 3,425,531 2/1969 Fuld ................................ 400/208.1
4,639,739 1/1987 Tsutsumi ....................... 346/76 PH

FOREIGN PATENT DOCUMENTS 61-8375 1/1986 Japan .................................. 400/208

*Primary Examiner*—Joseph W. Hartary
*Assistant Examiner*—Gerald E. Preston
*Attorney, Agent, or Firm*—Antonelli, Terry Wands

[57] ABSTRACT

A thermal transfer printer has a platen and a thermal head between which are pinched a transfer paper sheet and an ink film, so that the ink is transferred from the ink film to the transfer paper sheet as heat is applied to the transfer paper sheet by the thermal head. The film is supplied by a supply roll and is taken-up by a take-up roll. The thermal head is swingable between a position where it contracts the platen and a position away from the platen. When the thermal head is in the position away from the platen, the distance therebetween is greater than the maximum diameter of the supply roll. A film drum can hold a plurality of films each being constituted by the supply roll and the take-up roll. Swing arms are provided for demounting the supply roll of a selected film from the film drum and for bringing the same to a position away from the film drum, and also for returning the same from this position to the film drum. During the movement of the supply roll between the position in the film drum and the position away from this position, the thermal head is moved away from the platen so as not to hinder the movement of the supply roll.

4 Claims, 17 Drawing Sheets

THERMAL TRANSFER PRINTER

BACKGROUND OF THE INVENTION

1. Field of the Invention

The present invention relates to a thermal transfer printer and, more particularly, to an improvement which can suitably be employed in thermal transfer printers making use of linear wide film.

2. Description of the Prior Art

FIG. 30 shows a typical conventional color thermal printer. This printer has a paper tray 231 on an upper portion of a casing 230 which constitutes the main part of the printer. The casing 230 accommodates a thermal head 232, a platen 233 and a plurality of film guide rollers. A film 236 is supplied from and taken-up by a film supply roller 234 and a film take-up roller 235 which also are disposed in the casing 230 via the film guide rollers past a gap between the platen 233 and the thermal head 232. This known thermal printer suffers from a disadvantage in that an upper cover portion of the casing 230 has to be swung about a hinge 238 in order to make the interior of the casing accessible for the purpose of, for example, renewal of the film or maintenance of the internal parts. In addition, mounting and demounting of the wide film in the stretched state causes a risk for the film to be damaged.

SUMMARY OF THE INVENTION

Accordingly, an object of the present invention is to provide a thermal printer which is improved to facilitate the mounting and demounting of the film.

To this end, according to the invention, there is provided a thermal transfer printer in which the distance between both rolls of the film is decreased when the film is to be mounted and demounted, whereas, when the printing is to be conducted, the distance between both rolls is increased so as to press the film portion between both rolls onto the transfer paper. This arrangement facilitates the handling of the film during mounting and demounting, and reduces any tendency for the film to be damaged.

The above and other objects, features and advantages of the invention will become apparent from the following description of the preferred embodiment.

BRIEF DESCRIPTION OF THE DRAWINGS

The accompanying drawings show an embodiment of the present invention in which.

DESCRIPTION OF THE PREFERRED EMBODIMENT

Figure 1:
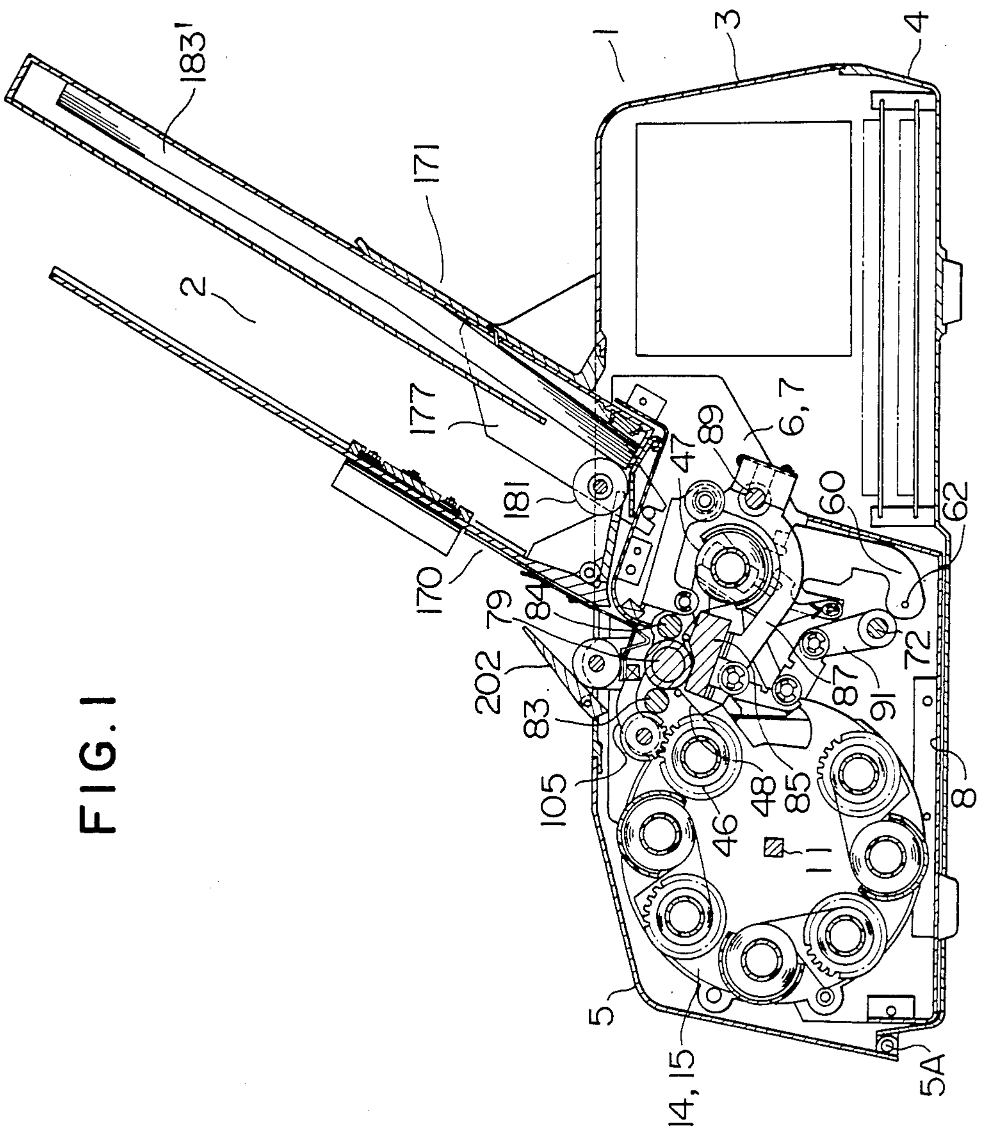
FIG. 1 is a sectional side elevational view of a printer taken along a neutral plane of the printer embodying the present invention.
Figure 2:
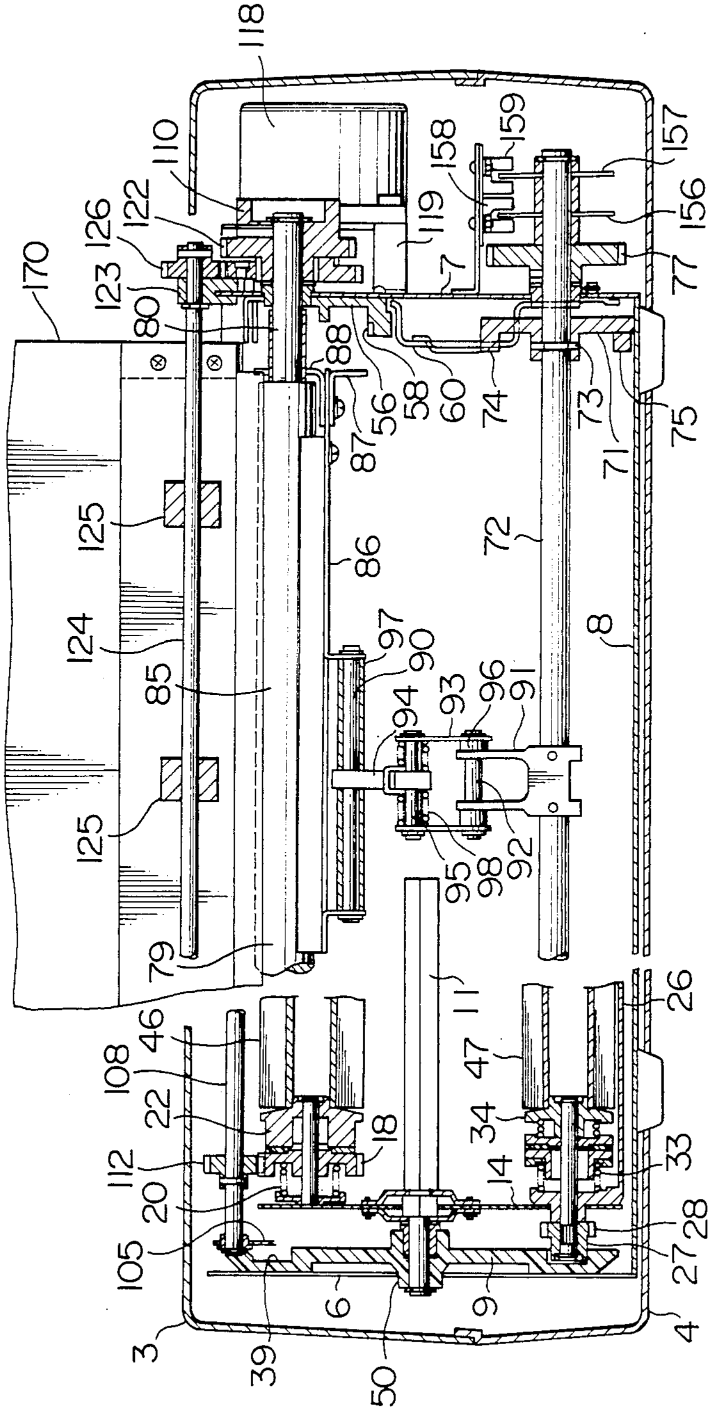
FIG. 2 is a sectional front elevational view of the printer.

A preferred embodiment of the present invention will be described hereinunder with reference to the accompanying drawings. Referring to FIGS. 1 and 2, a thermal printer embodying the present invention has a main part 1 and a paper feeding device 2 detachably secured to the main part 1. The paper feeding device is provided with both automatic feeding means and manual feeding means, as will be explained later.

The main part 1 has an outer casing which is constituted by an upper outer case 3, a lower outer case 4 and a door 5. The door 5 is hinged to the lower outer case 4 so as to be swung between an open position and a closed position. The door 5 is disposed on the front side of the printer main part 1, so that the front part of the interior of the printer main part 1 becomes easily accessible as the door 5 is opened.

The outer case of the printer encases the mechanical parts and electric control devices of the printer which are disposed, respectively, in a front part and a rear part of the space inside the outer case.

The supporting frame for the mechanical parts is constituted by a left side plate 6, a right side plate 7 and a bottom plate 8.

Figure 20:
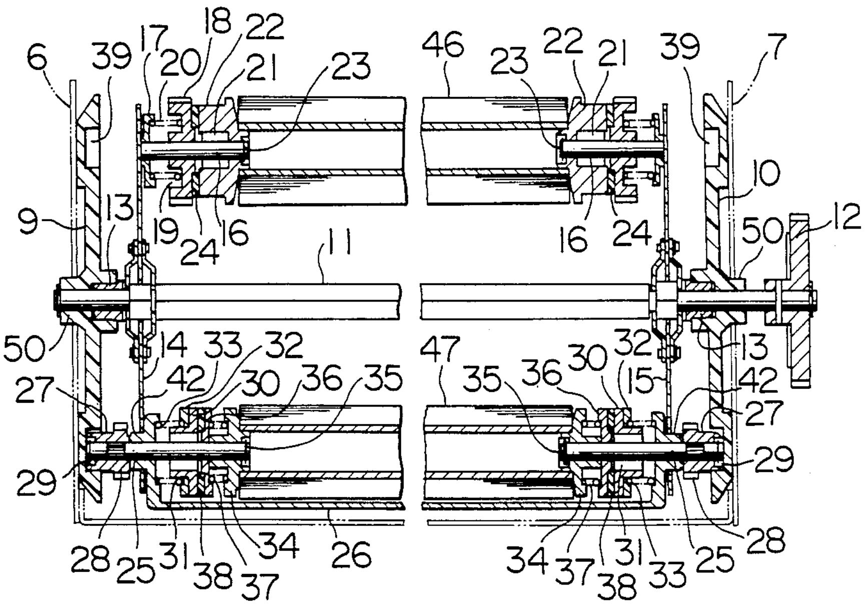
FIG. 20 is a sectional view of the film drum.

The construction of the film drum will be described hereinunder with reference to FIGS. 2 and 20. A left film roll guide 9 and a right film roll guide 10 are fixed to the left side plate 6 and the right side plate 7, respectively. These left and right side plates 6 and 7 are made of steel, while the film roll guides 9 and 10 are made of a plastic. A drum shaft 11 which is rotatably supported by the central portions of both film roll guides 9, 10 is long enough to span both side plates 6 and 7 and a drum gear 12 is fixed to the portion of the drum shaft 11 projecting beyond the right side plate 7. In order to smooth the rotation of the drum shaft 11, the film roll guides 9 and 10 are provided with bearings 13 and 13.

A left cassette drum supporting side plate 14 and a right cassette drum supporting side plate 15 are fixed to the portions of the drum shaft 11 near the inner surfaces of the film roll guides 9 and 10, respectively.

The film drum, which is generally constructed as explained above, is provided with a film supporting device for supporting a film cassette which will be mentioned later. The construction of the film supporting device will be explained with reference to FIG. 2 and FIGS. 19 and 21. The film supporting device is composed of two portions: namely, a movable portion which is detachably secured to the film drum and a fixed portion which is fixed to the film drum.

The description will be made first with respect to the fixed portion.

Take-up roll shafts 16 and 16 are fixed to both cassette drum supporting side plates 14 and 15. Spring retainer plates 17, 17 are rotatably supported by the base portions of the take-up roll shafts 16, 16. Take-up gears 18, 18 are rotatably supported by the take-up roll shafts 16, 16 so as to oppose the spring retainer plates 17, 17. Spring receiving recesses 19, 19 are formed in the surfaces of the take-up gears 18, 18 facing the spring retainer plates 17, 17. Helical compression spiings 20, 20 are loaded between the spring receiving recesses 19, 19 and the spring retainer plates 17, 17. Take-up roll holders 22, 22 are supported by the ends of the take-up roll shafts 16, 16 through one-way clutches 21, 21. The take-up roll holders 22, 22 are adapted to fit in the inner sleeve of a take-up film roll 46 such that projections (not shown) engage with notches formed in the inner sleeve. The take-up roll shafts 16, 16 are provided at their ends with stoppers 23, 23 for preventing the take-up roll holders 22, 22 from coming off. The one-way clutches 21, 21 are slidable on the take-up roll shafts 16, 16 in the axial direction of these shafts. The one-way clutches 21, 21 are so constructed that they permit the take-up roll holders 22, 22 to rotate freely in the direction for taking-up the film but to prevent the roll holders 22, 22 from rotating in the reverse direction. Friction plates 24, 24 are disposed between the take-up roll holders 22, 22 and the take-up gears 18, 18. The friction plates 24, 24 are formed of a frictional sliding material such as cork and synthetic felt. These friction plates 24, 24 are pressed onto the take-up roll holders 22, 22 by the helical compression springs 20, 20, so that the rotation of the take-up gears 18, 18 is transmitted to the take-up roll holders 22, 22 through the friction plates 24, 24. The take-up roll holders 22, 22 and the take-up gears 18, 18 are capable of sliding on the take-up roll shafts 16, 16 in the axial direction of these shafts. When replacing the film cassette, the user can mount and demount the take-up film roll 46 by axially moving the take-up roll holders 22, 22 against the force of the helical compression springs 20, 20.

The fixed portion of the film supporting device is generally constructed as described above, and four fixing portions are provided on both cassette drum supporting plates 14, 15 at a constant pitch.

A description will be explained hereinunder as to the movable portion of the film supporting device.

A film cover 26 is rotatably secured to supply roll shafts 25, 25. The film cover 26 is long enough to span both cassette drum supporting plates 14, 15. The film cover 26 serves as a supporting member for supporting the supply roll shafts 25, 25. Film cassette rollers 27, 27 are fixed to and carried by the outer ends of the supply roll shafts 25, 25. Film cassette gears 28, 28 are formed on the outer peripheries of the film cassette rollers 27, 27. Stoppers 29, 29 are provided on the outer ends of the roll shafts 25, 25 so as to prevent the film cassette rollers 27, 27 from coming off. These stoppers are provided so as to assure that the film cassette rollers 27, 27 do never come off, though they are fixed to the roll shafts 25, 25. Spring retainer seats are provided on the inner surfaces of the film cover 26. Driving plates 30, 30, which are supported by the supply roll shafts 25, 25 through one-way clutches 31, 31, have shaft portions which rotatably carry sliders 32, 32. Helical compression springs 33, 33 are loaded between the sliders 32, 32 and the spring retainer seats on the film covers 26, 26. Both roll shafts 25, 25 rotatably support supply roll holders 34, 34 at their inner ends. The supply roll holders 34, 34 are prevented from coming off by stoppers 35, 35 provided on the inner ends of the supply roll shafts 25, 25.

The supply roll shafts 25, 25 also rotatably carry driven plates 36, 36 which are disposed adjacent to the supply roll holders 34, 34. Spring retainer seats are formed on the opposing surfaces of the driven plates 36, 36 and the supply roll holders 34, 34, and twisted helical springs 37, 37 are loaded between these spring retainer seats. Friction plates 38, 38 interposed between respective driving plates 30, 30 and respective driven plates 36, 36 are made of a frictional material such as cork, plastic or felt.

The supply roll holders 34, 34 are drivingly connected to the driven plate 36, 36 through helical torsion springs. Since the one-way clutches 31, 31 are provided, the supply roll holders 34, 34 are prevented from rotating with respect to the supply roll shafts 25, 25 in the direction for supplying the film but can rotate relatively to the supply roll shafts 25, 25 in the direction reverse to the film supplying direction. This function is critical in relation to the movement of the external support means for the supply film roll which will be mentioned later, so that this function will be explained in more detail later in connection with the external support means.

The one-way clutches 31, 31, driven plates 36, 36, and the supply roll holders 34, 34 are slidably supported for sliding motion in the direction of axis of the supply roll shafts 25, 25. For the purpose of exchanging the supply film roll 47, the user axially moves the supply roll holders 34, 34 against the force of the helical compression spring 33, thus enabling the supply film roll 47 to be mounted and demounted.

Four movable portions of the film supporting device, each having the described construction, are arranged at a constant pitch. These movable portions are supported by portions of the film drum which have the following construction.

Annular film cassette roll guide grooves 39, 39 are formed in the inner surfaces of the film roll guides 9, 10. The film cassette rollers 27, 27 of the movable portion of the film supporting device are received in these guide grooves 39, 39. The film cassette rollers 27, 27 are supported such that they can move freely along these guide grooves 39, 39. The film cassette roll guide grooves 39, 39 are provided with entrance/exits 40, 40 for the film cassette rollers 27, 27. These entrance/exits 40, 40 are formed by cutting portions of both film roll guides 9, 10 so as to open these film cassette guide grooves 39, 39.

Figure 15:
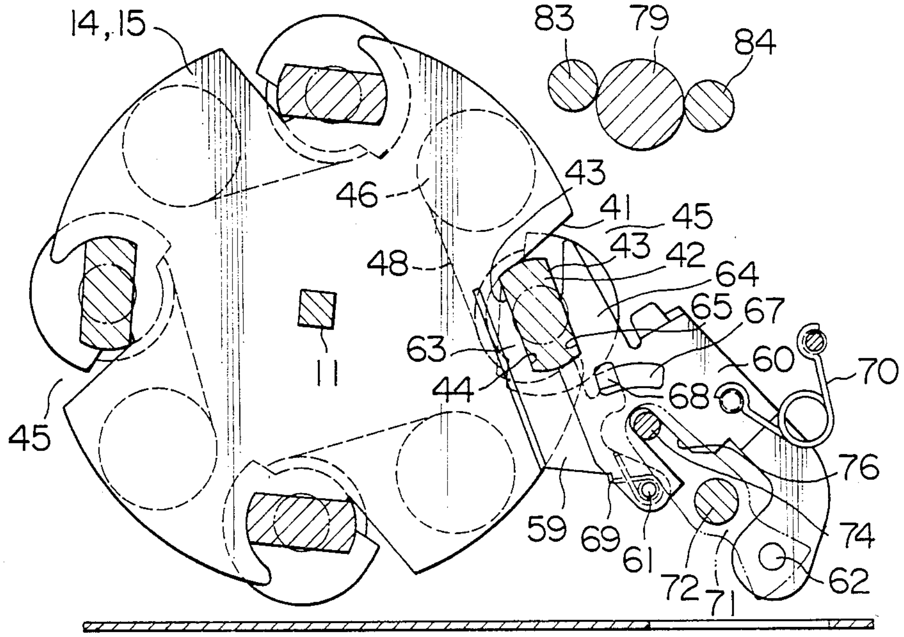
FIG. 15 is an illustration of operation of the supply roll film, swing arm and a deflector.
Figure 16:
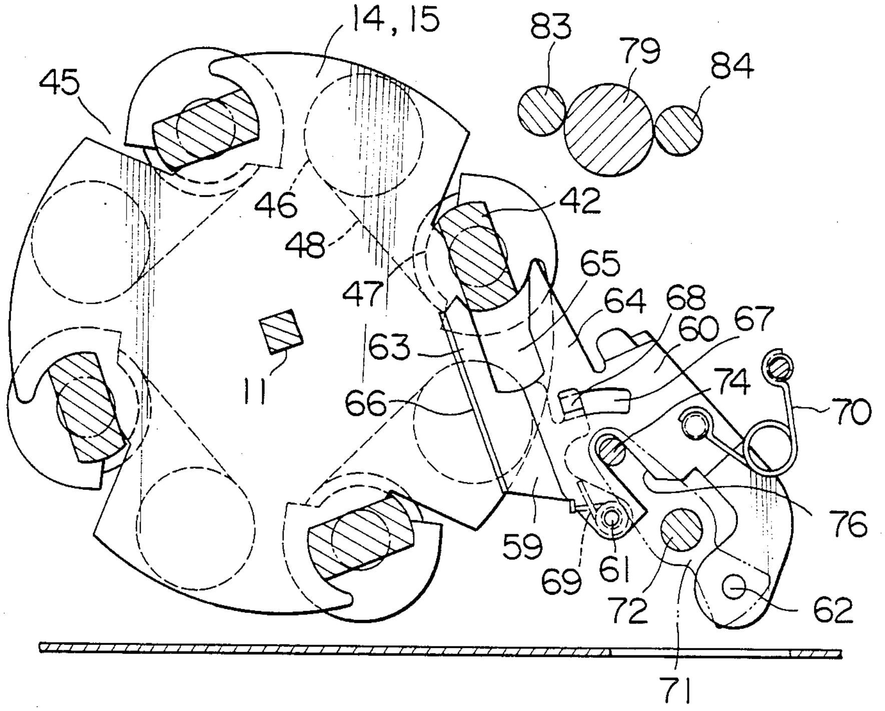
FIG. 16 also is an illustration of operation of the supply roll film, swing arm and the deflector.

As will be seen from FIGS. 15 and 16, film unit supporting grooves 41, 41 are formed in both cassette drum supporting side plates 14, 15. There are four film unit supporting grooves 41 at a constant pitch in each cassette drum supporting side plate. More specifically, the film unit supporting grooves 41 are arranged such that they appear alternatingly with the fixed portions of the film supporting device mentioned before. The film unit supporting grooves 41 are adapted for supporting the supporting portions 42, 42 of the film cover 26 mentioned before. The arrangement is such that flat portions 43 provided symmetrically on the supporting portions 42, 42 are born by plane portions 44, 44 formed in inner portions of the film unit supporting grooves 41. The film unit supporting grooves 41 are formed in both cassette drum supporting plates 14, 15 so as to extend obliquely and so as to externally open as at 45.

When the supporting portions 42, 42 of the film cover 26 are received in the film unit supporting grooves 41, the flattened portions 43, 43 of the supporting portions 42, 42 are born by plane portions 44 of the film unit supporting grooves 41, 41 so that the film cover 26 cannot rotate. The supporting portion for supporting the movable portion of the film drum has a construction as described hereinabove.

An explanation will be made hereinunder as to the film cassette. The film cassette is constituted by a take-up film roll 46 and a supply film roll 47 and a single film 48 are wound on and stretched between these rolls 46 and 47. One film cassette is prepared for each of four colors which are black, red, blue and yellow.

The mounting of the film cassette is conducted in a manner explained hereinunder. One end of the take-up film roll 46 is pressed onto the associated take-up roll holder 22 so as to push the latter against the force of the pressing helical spring 20. While pressing the take-up roll holder 22, the other end of the take-up film roll 46 is aligned with and fit in the end of the other take-up roll holder 22. In the same way, the supply film roll 47 is mounted on the supply roll holders 34, 34.

The film cassette can be mounted in the manner described above. However, the mounting of the supply film roll 47 on the supply roll holders 34, 34 is rather difficult because of the presence of the film cover 26. To cope with this problem, it is preferred that the supply film roll 47 is mounted on the supply roll holders 34, 34 before the film cover 26 including the supply roll holders 34, 34 is attached to the film drum. The film cassette is supported by the film roll guides 9, 10 and the cassette drum supporting plates 14, 15 in the described manner. The film drums having the described construction are secured detachably to both side plates 6, 7 of the supporting frame.

Figure 19:
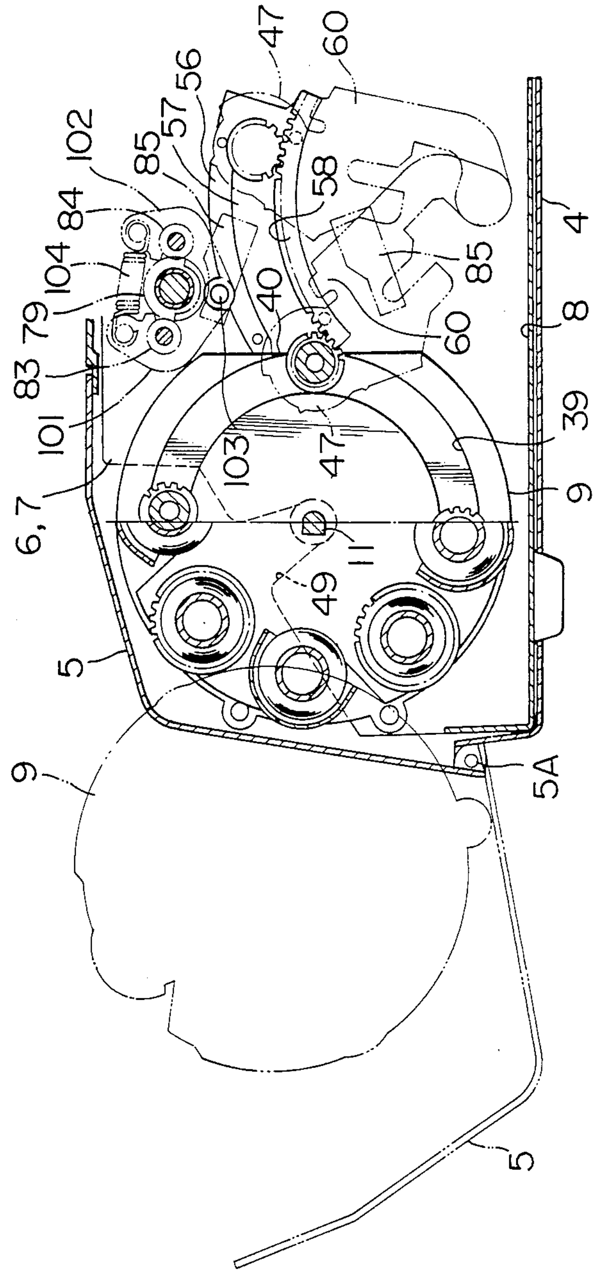
FIG. 19 is an illustration of a film drum and an external support for the supply film roll.
Figure 21:
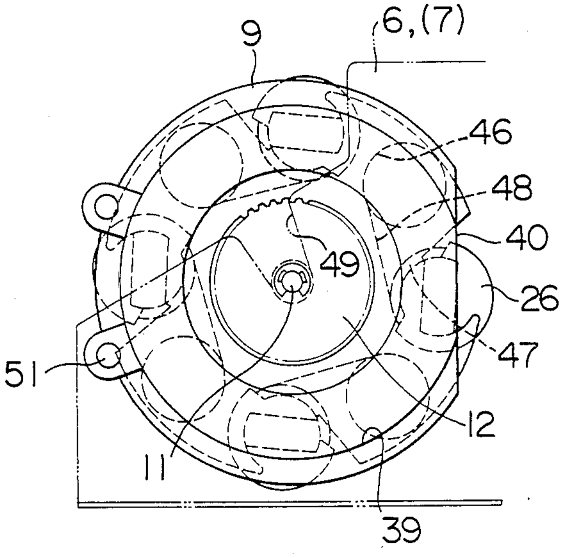
FIG. 21 is a side elevational view of the film drum.

More specifically, supporting grooves 49 are formed in the left and right side plates 6, 7 as shown in FIGS. 19 and 21. These supporting grooves 49 support the bosses 50, 50 of the film roll guides 9, 10. The film roll guides 9, 10 are supported rotatably on the left and right side plates 6, 7 for rotation about the pivot points 51, so that the film drum as a whole can be extracted as indicated by chain lines in FIG. 19. In this case, the bosses 50, 50 of the film roll guides 5, 10 are extracted from the supporting grooves 49, so that it is necessary that the door 5 of the outer case is opened in advance of the extraction of the film drum. The film drum as a whole is extracted for the purpose of exchange of the film cassette and the inspection of the interior of the printer main part 1.

Usually, the film drum as a whole is locked so as not to be extracted. The locking of the film drum is effected by a film lock lever 52 shown in FIG. 3. The film lock lever 52 is rotatably supported on the right side plate 7 through a support shaft 53. The arrangement is such that, when the film drum as a whole is set in the printer main part 1, a hook 54 of the film lock lever 52 engages with a boss 50 of the film roll guide 10, so as to lock the film drum as a whole against outward movement. The operation of the film lock lever will be explained in detail hereinafter.

During operation of the printer, the supply film roll 47 of the cassette is extracted from the film drum and is supported by the supply film roll external supports 56 which will be explained in detail hereinunder with specific reference to FIG. 19.

The supply film roll external supports 56 are arranged in a pair, one on the left side plate 6 and the other on the right side plate 7, and have arcuate grooves 57, respectively. The groove 57 is open at its one side and the end of this opening faces the entrance/exit of the associated film cassette guide groove 39. A rack 58 is formed in the lower side of the groove 57 for meshing engagement with the film cassette gear 28 mentioned before. When the supply film roll 47 supported by the supply roll holder 34 moves along the supply film roll external support 56, the film cassette gear 28 rolls on the rack 58. The rotation of the film cassette gear 28 is transmitted to the supply film roll 47. In consequence, the film cassette gear 28 and the supply roll shaft 25 rotate in the direction for delivering the film 48 when the supply film roll 47 moves to the right on the supply film roll external support 56. The amounts of rotation of the film cassette gear 28 and the supply roll shaft 25 provide such an amount of feed of the film 48 which does not cause any slack of the film 48 between the supply film roll 47 and the take-up film roll 46. This amount of rotation does not coincide with the amount of rotation of the supply film roll 47 because the diameter of the film on the supply film roll varies in accordance with the amount of feed of the film. To this end, the aforementioned one-way clutch 31 is designed such that it transmits the rotation of the supply roll shaft 25 to the supply film roll 47 only by an amount required by the supply film roll 47, i.e., such that it slips when the rotation of the supply roll shaft 25 is in advance of the rotation of the supply film roll 47.

Conversely, when the supply film roll 47 moves to the left, the one-way clutch 31 directly transmits the rotation of the supply roll shaft 25 to the driving plate 30. This rotation is transmitted to the supply roll holder 34 via the friction plate 38, driven plate 36 and the torsion helical spring 37, thereby rotating the supply film roll 47 in the direction for taking up the film 48. For the same reason as that described before, the amount of rotation of the supply roll shaft 25 does not coincide with the amount of rotation required by the supply roll film 47. Therefore, the ratio of the number of teeth of the rack 58 and the film cassette gear 28 is so selected that a rotation amount of the supply roll shaft 25 which is essentially greater than the required amount is given to the supply roll shaft 25. The difference in the amount of rotation is absorbed by the slip between the friction late 38 and the driven plate 36.

The film supply roll 47 reversibly moves between the position adjacent to the film drum and the position adjacent to the film roll external support 56 past the entrance/exit 40 of the film cassette roll guide groove 39 and the open end of the groove 57. This reciprocatory movement is effected by deflectors 59 and swing arms 60. A detailed description will be made hereinunder as to the deflectors 59 and the swing arms 60, with reference to FIGS. 2, 9, 11, 17 and 18. As will be seen from these Figures, the deflector 59 is rotatably supported by a support shaft 61, while the swing arm 60 is supported by a support shaft 62 also rotatably. Claws 63 and 64 are formed on the end portions of the deflector 59 and the swing arm 60. Both claws 63 and 64 in cooperation constitute a clamper 65. Tapered surfaces are formed on the inner sides of the claws 63, 64 near the ends of these claws, such as to diverge outward. The tapered surface on the claw 64 has a depth larger than that formed on the claw 63. A bent slide portion 66 is formed on the outer surface of the deflector 59. The slide portion 66 has a length sufficiently greater than the claw 63, e.g., substantially twice the length of the claw 63.

The swing arms 60 are rotatably supported by the left and right side plates 6, 7 through supporting shafts 62, while the shafts 61 for supporting the deflectors 59 are provided on the swing arms 60, so that the deflectors 59 rotate together with the swing arms 60. Each swing arm 60 is provided with a notch or window 67, while the deflector 59 is provided with a projection 68. The projection 68 is received in the window 67. The deflector 59 is rotatable about the supporting shaft 61 insofar as the projection 68 is movable in the window 67. A helical spring 69 provided on the support shaft 61 has one end retained by the deflector 59 and the other end retained by the swing arm 60. The helical spring 69 urges the deflector 59 in such a direction for opening the clamper 65. As will be seen from FIGS. 15, 16, 17 and 18, a swing arm spring 70 urges the swing arm 60 so as to press the same onto the film drum when the swing arm 60 is in a position between the substantially mid point of the stroke of the swing arm 60 and the film drum.

As will be understood specifically from FIG. 15, the clamper 65 of the deflector 59 and the swing arm 60 holds the supporting portion 42 of the film cover 26 which portion 42 in turn supporting the supply film roll 47. As the swing arm 60 is swung clockwise in this state, the supporting portion 42 comes off through the opening 45 of the film unit supporting groove 41. At the same time, the film roll 27 comes off through the entrance/ exit 40 of the film cassette roll guide groove 39 so as to be received in the guide groove 57 of the supply film roll external support 56. Simultaneously with this moment, the film cassette gear 28 is brought into engagement with the rack 58. The supply film roll 47 moves along the groove 57 while being pressed by the swing arm 60.

Conversely, when the swing arm 60 is swung counter-clockwise, the supply film roll 47 returns through by taking the reverse procedure, so that the film cassette roller 27 is reset in the film cassette roll guide groove 39 past the entrance/exit 40. Needless to say, the supporting portion 42 is returned into the film unit supporting groove 41.

During the movement of the supply film roll 47 explained above, the clamper 65 of the swing arm 60 clamps the flattened portion .43 of the supporting portion 42 so that the film cover 26 does not rotate, whereby the feed and take-up of the film can be conducted without any problem.

Figure 5:
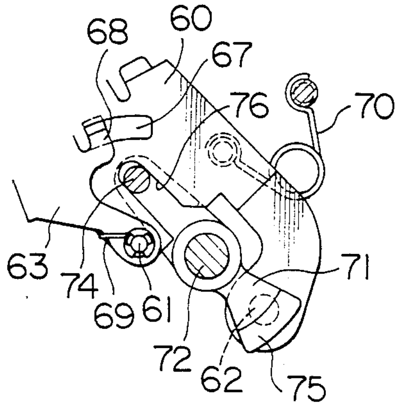
FIG. 5 is an illustration of operation of a swing arm and a swing arm crank incorporated in the printer.
Figure 7:
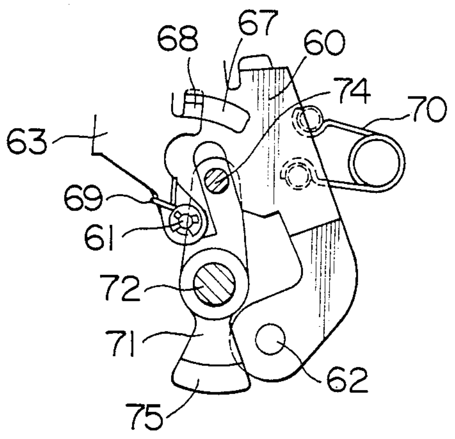
FIG. 7 is an illustration of operation of a swing arm and a swing arm crank incorporated in the printer.
Figure 8:
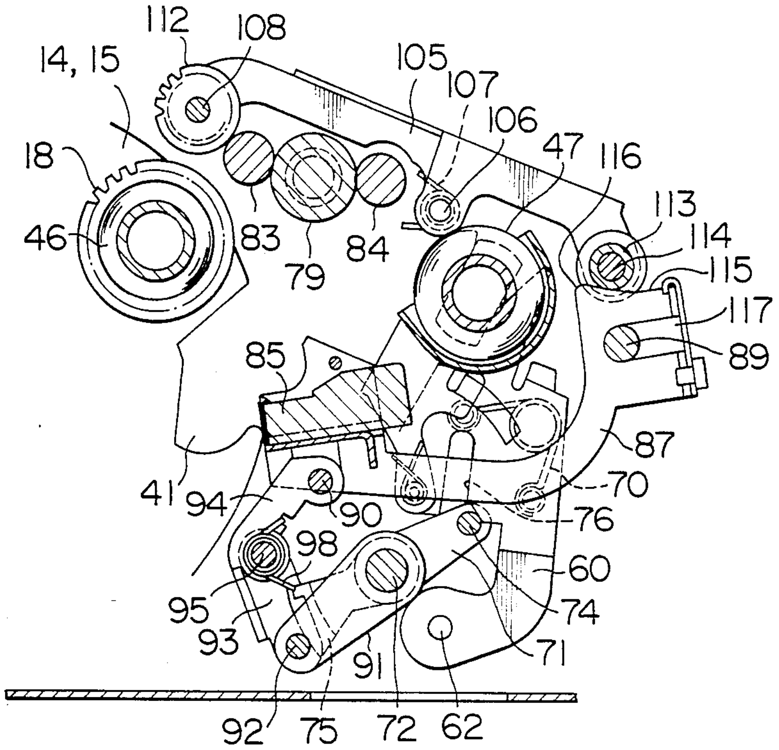
FIG. 8 is an illustration of operation of a thermal head, supply film roll and a traction lever incorporated in the printer.
Figure 9:
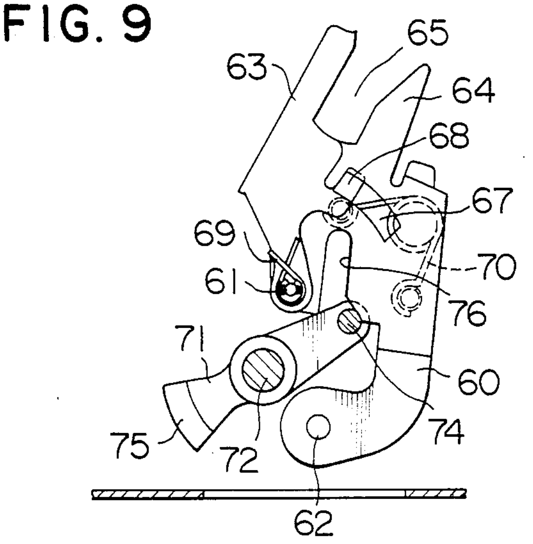
FIG. 9 is an illustration of operation of a swing arm and a swing arm crank incorporated in the printer.

A description will be made hereinunder as to a swing arm crank 71 adapted for driving the swing arm 60. Although only a right-side swing arm crank 71 is shown in FIG. 2, a pair of swing arm cranks 71 are fixed to both ends of a main shaft 72 which is rotatably supported by the left side plate 6 and the right side plate 7. The swing arm cranks 71 are fixed to the main shaft 72 by means of lock pins 73. A crank pin 74 and a pressing projection 75 are formed on the swing arm crank 71 at a 180° interval from each other. As will be understood from FIGS. 5 and 7, the crank pin 74 is received in a groove 76 of the swing arm 60. The arrangement is such that clockwise rotation of the swing arm crank 71 causes the swing arm 60 to be swung clockwise about the support shaft 62 against the force of the swing arm spring 70. When the swing arm 60 has been rotated substantially to the position shown in FIG. 7, the swing arm spring 70 substantially reaches the dead point thereof. The swing arm spring 70, therefore, acts to urge the swing arm clockwise when the swing arm has been moved beyond this position. FIGS. 8 and 9 show the state in which the swing arm 60 has reached its stroke end in the clockwise swinging. Simultaneously with the arrival of the swing arm 60 at this stroke end, the crank pin 74 comes off the groove 76 in the swing arm 60, so that further rotation of the swing arm crank 71 is not transmitted to the swing arm 60 but the swing arm 60 is pressed to the stroke end point by the swing arm spring, without moving beyond this position. This is because the film cassette roller 27 adjacent to the supply film roll 47 contacts the right end of the groove 57 in the supply film roll external support 56.

Figure 11:
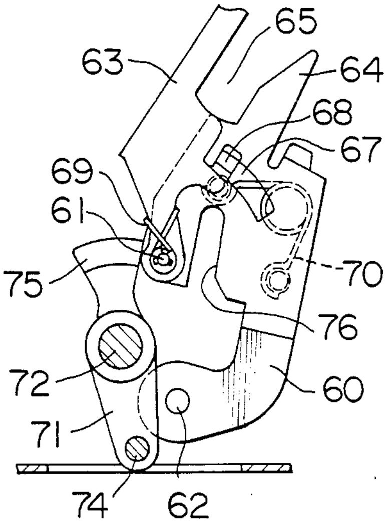
FIG. 11 is an illustration of operation of a swing arm and a swing arm crank incorporated in the printer.

On the other hand, the swing arm crank 71 further rotates clockwise. Then, the pressing projection 75 of the swing arm crank 71 presses the left end surface of the swing arm 60 as shown in FIG. 11, thus holding the swing arm 60 at this stroke end, while stopping the rotation of the swing crank arm 71. Since the swing arm 60 is pressed by the pressing projection 75, any leftward movement of the supply film roll 47 along the supply film roll external support 56 is prevented, which movement may otherwise be caused by the force for extracting the film 48 which is applied when the printing is to be conducted as will be explained later. It is true that the swing arm 60 is held in the right stroke end by the swing arm spring 70. The spring 70, however, can hold the swing arm only resiliently, so that it is necessary to firmly hold the swing arm 60 by the swing arm spring 70 as explained before.

As the swing arm crank 71 is rotated counterclockwise from the state shown in FIG. 11 past the position shown in FIG. 9, the crank pin 74 is inserted into the groove 76 in the swing arm 60. Thus, the swing arm crank 71 is brought into engagement with the swing arm 60, so that the swing arm 60 is rotated counterclockwise together with the swing arm crank 71. Finally, the swing arm 60 is reset in the position shown in FIG. 5. In consequence, the supply film roll 47 is moved from the position on the film roll external support 56 to the position on the film drum.

An explanation will be given hereinunder as to the manner in which the supply film roll 47 is delivered to the swing arm 60 when the supply film roll is disposed on the film drum, with specific reference to FIGS. 15, 16, 17 and 18.

Figure 17:
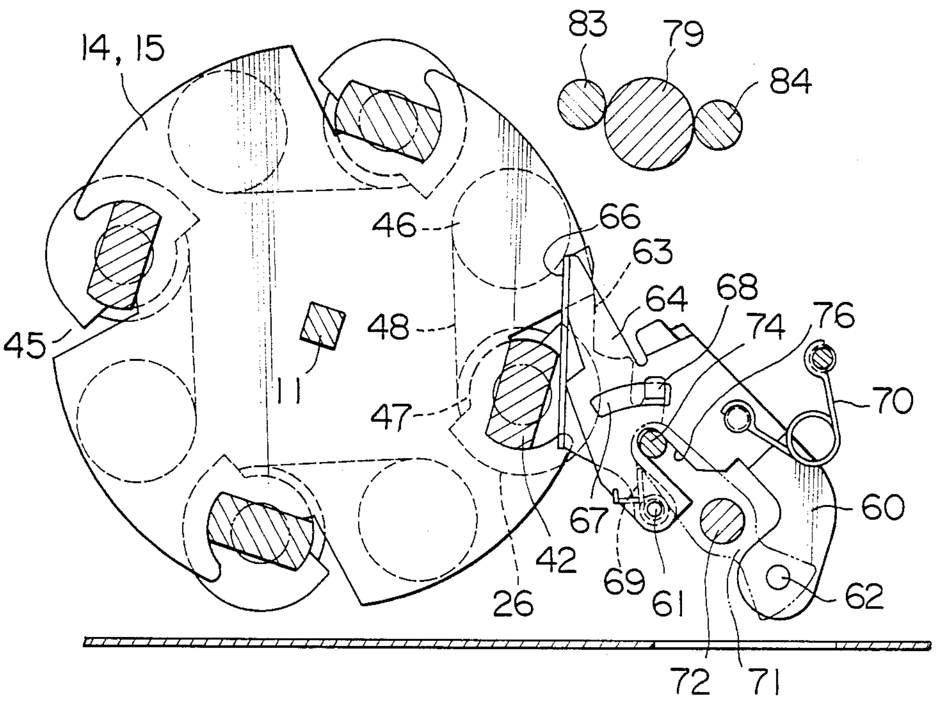
FIG. 17 also is an illustration of operation of the supply roll film, swing arm and the deflector.

FIG. 15 shows the supply film roll 47 in the state in which its supporting portion 42 is clamped by the clamper 65 formed by the swing arm 60 and the deflector 59. This state is accomplished by the following procedure. The film cassette having the take-up film roll 46 and the supply film roll 47 is supported by the cassette drum supporting side plates 14 and 15. These side plates 14 and 15 are rotated counter-clockwise. As these side plates pass the position shown in FIG. 18, the supporting portion 42 adjacent to the supply film roll 47 is brought into contact with the slide portion 66 of the deflector 59. A further counter-clockwise rotation of the cassette drum supporting side plates 14, 15 causes the deflector 59 to be rotated clockwise about the support shaft 61 against the force of the helical spring 69, as shown in FIG. 17. In this state, the swing arm 60 does not swing because it is pressed and fixed by the swing arm crank 71. As a result of the clockwise rotation of the deflector 59, the supporting portion 42 is prevented from moving into the groove 57 in the supply film roll external support 56 and is kept within the film cassette roll guide grooves 39, 39 in the film guide rolls 9, 10. The cassette drum supporting side plates 14, 15 continue to rotate counter-clockwise. As the supporting portion 42 of the supply film roll 47 is moved beyond the end of the deflector 59, the deflector 59 is rotated counter-clockwise about the support shaft 61 by the force of the helical spring 69 so as to be reset in the starting position. In this state, the supply film roll 47 is held at a position which is slightly offset counter-clockwise from the position shown in FIG. 16. The deflector 59 is finally returned to the position where the projection 68 abuts the left end of the window 67 in the swing arm 60.

In this state, the clamper 65 formed by the swing arm 60 and the deflector 59 is opened, and the supporting portion 42 of the supply film roll 47 is slightly offset counter-clockwise from the end of the clamper 65. Therefore, the clockwise rotation of the cassette drum support side plates 14, 15 causes the supporting portion 42 supply film roll 47 to be positioned on the entrance to the clamper 65. A further clockwise rotation of the cassette drum support side plates 14, 15 causes the supporting portion 42 of the supply film roll 47 to be received in the clamper 65 as shown in FIG. 15.

The delivery of the supply film roll 47 to the swing arm 60 is effected in the manner explained above. Thus, the supply film roll of the film cassette shown in the uppermost position of FIG. 18 is delivered by rotating the cassette drum support side plates 14, 15 clockwise, with the result that the supporting portion 42 of the supply film roll 47 to be received in the clamper.

Figure 18:
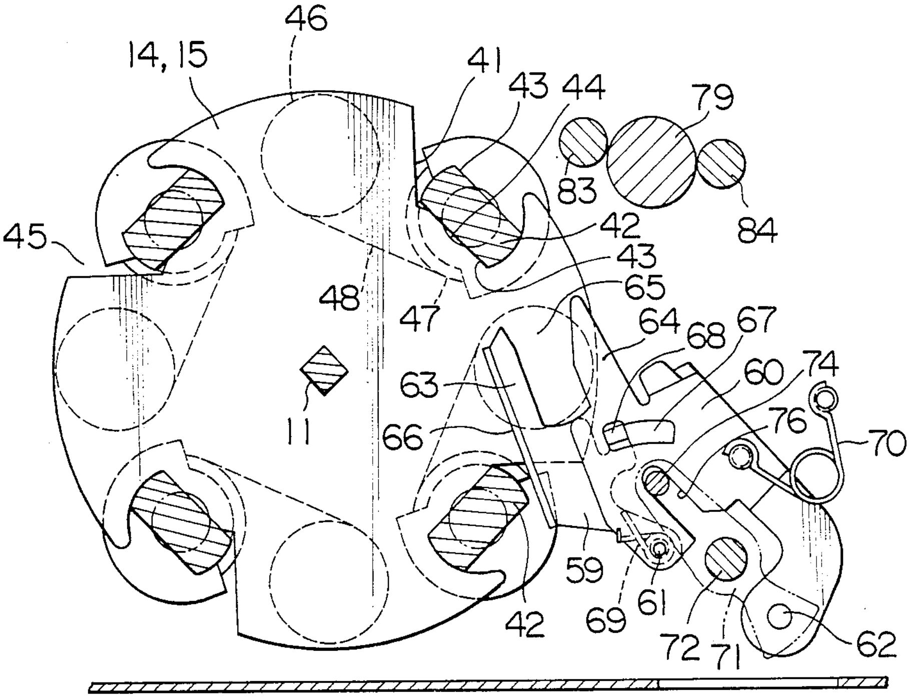
FIG. 18 also is an illustration of operation of the supply roll film, swing arm and the deflector.

In order to take out the film cassette of a desired color from among four film cassettes of different colors, the cassette drum is first rotated counter clockwise to bring the film cassette of the desired color to the position of the supply film roll 47 shown in FIG. 18. The cassette drum 47 is then stopped at this position and then rotated clockwise so as to put the supporting portion 42 of the supply film roll 47 into the clamper.

As mentioned before, the film drum as a whole is extracted from the printer main part 1 when the film cassette is to be replaced. A supplementary explanation will be made hereinunder in this connection.

Figure 3:
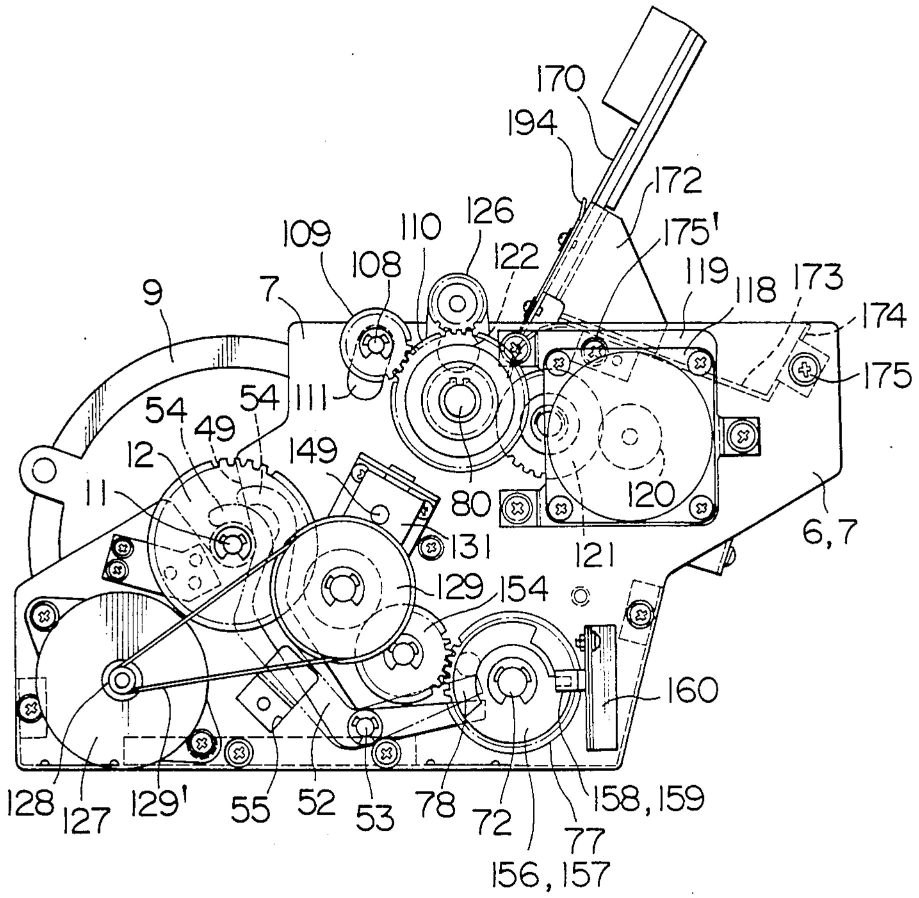
FIG. 3 is a side elevational view of a driving system of the printer.

As shown in FIGS. 2 and 3, the main shaft 72 is provided with a main gear 77. The main gear 77 is provided with a lock lever engaging pin 78. As the main gear 77 is rotated counter-clockwise, the upper surface of the rear end of the film lock lever 52 is pressed downward by the lock lever engaging pin 78, so that the film lock lever 52 is rotated clockwise about the support shaft 53. In consequence, the hook 54 of the film lock lever 52 is disengaged from the boss 50 of the film roll guide 10. It is, therefore, possible to extract the film drum as a whole from the printer main part 1.

The arrangement is such that, in the state in which the hook 54 of the film lock lever 52 is disengaged from the boss 50 of the film roll guide 10, any one of the film cassette can be received in the film drum. The hook 54 can be disengaged when the swing arm is, for example, in the position shown in FIG. 18.

It will be understood that, since the supply film roll 47 of the film cassette is not disposed on the film roll external support 56, there is no difficulty in extracting the film drum as a whole as shown in FIG. 19.

If the film drum as a whole is extracted from the printer main part with the supply film roll 47 placed on the film roll external support 56, a long portion of the film 48 is extracted from the supply film roll 47, causing a risk for the film to be damaged or torn. This problem, however, is overcome because the hook 54 locks the film drum 47 as a whole when the latter is on the film roll external support 56, in such a manner as to prevent the film drum as a whole from being extracted out of the printer main body 1.

A description will be made hereinunder as to the construction of the thermal head and the platen, as well as other parts associated therewith.

Referring to FIG. 2, the platen 79 is provided on the platen shaft 80. The platen shaft 80 is rotatably supported by the left side plate 6 and the right side plate 7 of the supporting frame through respective bearings 81. In order to prevent the platen shaft 80 from moving to the left and right, a sleeve 82 disposed between the platen 79 and the bearings 81 is fitted on the platen shaft 80. As will be seen from FIG. 1, an auxiliary roller A 83 and an auxiliary roller B 84 are arranged to contact with the outer peripheral surface of the platen 79. The auxiliary rollers A and B are arranged substantially in symmetry with each other.

The platen 79 and the auxiliary rollers A and B are disposed at a level above the level of the film roll external support 56 so as not to hinder the supply film cassette 74 to pass through the space under these auxiliary rollers.

The thermal head 85 is secured to a head base 86 as shown in FIGS. 1 and 2. The thermal head 85 is a so-called line-type thermal head having a length approximating that of the platen 79. At the same time, head arms 87 are secured to the head base 86. A head stopper 88 also is secured to the head base 86.

The head arms 87 are rotatably carried by a head arm shaft 89 which in turn is supported by the left side plate 6 and the right side plate 7 of the supporting frame.

Figure 10:
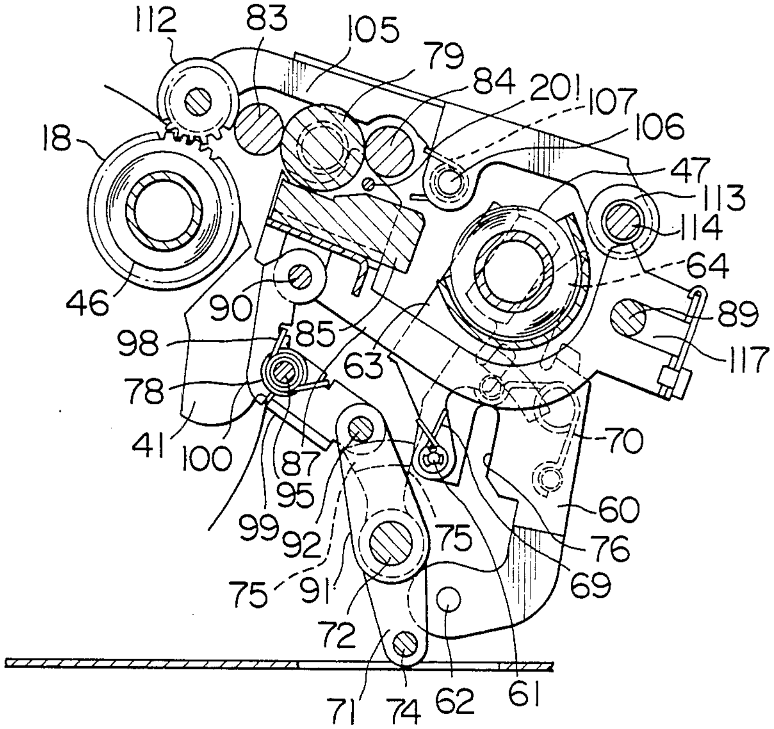
FIG. 10 is an illustration of operation of a thermal head, supply film roll and a traction lever incorporated in the printer.

In consequence, the thermal head 85 is carried by the head arm 87 so that it is rotatable about the axis of the head arm shaft 89. The arrangement is such that the arcuate path of movement of the thermal head 85 intersects the arcuate line of the film roll external support 56. FIG. 10 shows the thermal head 85 in the uppermost position. The thermal head 85 located at this position presses the platen with a pressure which is necessary for the transfer of the information. A head stopper 88 contacts the platen shaft 80 through the sleeve 82 so as to regulate the position of the thermal head 85 with respect to the platen 79 such that the linear heat generating means on the thermal head 85 can correctly make a linear contact with the platen 85.

Figure 4:
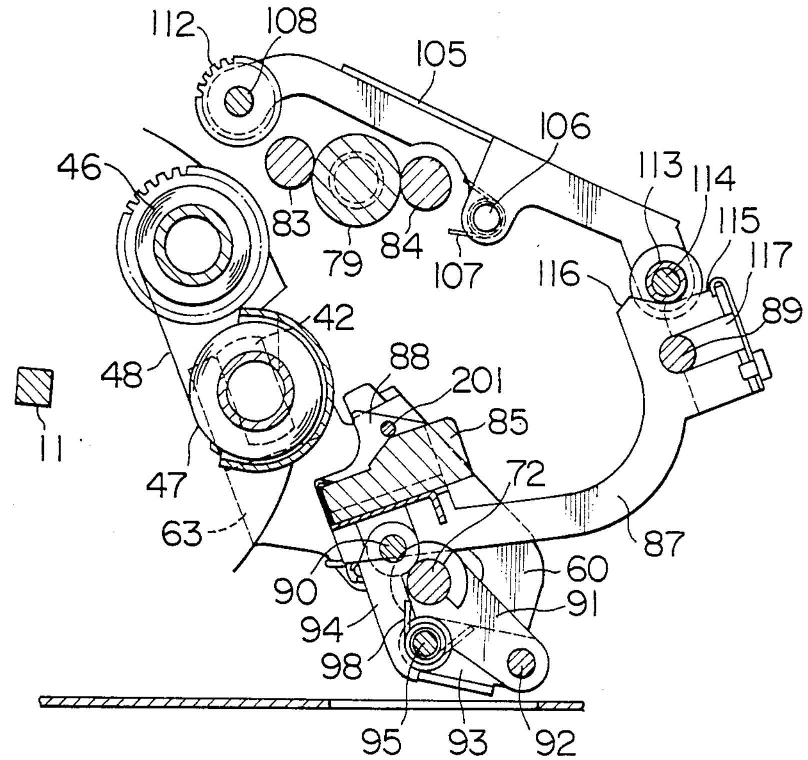
FIG. 4 is an illustration of operation of a thermal head, supply film roll and a traction lever incorporated in the printer.

FIG. 4 shows the thermal head 85 in the lowermost position. Thus, the thermal head 85 is movable along the aforementioned path between the lowermost position shown in FIG. 6 and the uppermost position shown in FIG. 10.

A head pin 90 is attached to the head base 86 of the thermal head 85 as shown in FIG. 2. A pair of tabs are formed by cutting and bending predetermined portions of the head base 86 and the head pin 90 is attached to these tabs. The head pin 90 is connected, through a connector means, to a head crank arm 91 which is fixed to and supported by the main, shaft 72. More specifically, the end of the head crank arm 91 rotatably supports a crankshaft 92. As will be understood from FIGS. 12, 14 and 15, the connector means is constituted by a connecting rod A 93 and a connecting rod B 94. Both connecting rods A and B are rotatably carried by the connector shaft 95. The end of the connecting rod A is rotatably supported by the crank shaft 92. The movement of the connecting rod A in the left and right directions is limited by a boss 96 formed integrally with the head crank arm.

The end of the connecting rod B is rotatably supported by the head pin 90. A couple of sleeves 97 fitted onto the head pin 90 limits the movement of the connecting rod B in the left and right directions. The connection rod B is disposed such as to be positioned at the mid portion of the thermal head along the length thereof. A connector helical spring 98 is secured to the connector shaft 95. The connector helical spring 98 is wound on the connector shaft 95 substantially over the entire length of the connector shaft 95. The central portion of the connector helical spring 98 is retained by the connecting rod B, while both ends of the same are retained by the connecting rod A. The connector helical spring 98 urges both connecting rods A and B such that the angle formed between these connecting rods is increased. However, this angle can not be increased beyond the angle shown in FIG. 13 at which stoppers 99 and 100 which are provided on the connecting rods A and B, respectively, abut each other.

A description will be made hereinunder as to the rotational movement of the thermal head 85.

It is assumed here that the thermal head 85 is located at the lowermost position as shown in FIG. 4. As the main shaft 72 rotates clockwise, the head crank arm 91 is rotated to the position shown in FIG. 6 and then to the position shown in FIG. 8. The rotation of the head crank arm 91 from the position shown in FIG. 4 to the position shown in FIG. 6 does not cause substantial upward movement of the thermal head 85. During the rotation of the head crank arm 91 from the position shown in FIG. 6 to the position shown in FIG. 8, the thermal head 85 is moved slightly upward. A further rotation of the head crank arm 91 from the position shown in FIG. 8 to the position shown in FIG. 10 causes the thermal head 85 to be largely moved upward so as to be pressed onto the platen 79.

It will thus be seen that the amount of the movement of the thermal head along the arcuate path is not proportional to the angle of rotation of the head crank arm 91. Namely, the vertical position of the thermal head 85 is not changed substantially when the head crankshaft 91 rotates past the positions shown in FIGS. 4 and 6 but the rotation of the head crank arm past the position shown in FIG. 8 causes a significant change in the vertical position of the thermal head 85. The amount of change in the vertical position of the thermal head 85 becomes small again as the head crank arm 91 approaches the position shown in FIG. 10.

Thus, the speed of the vertical movement of the thermal head 85 is changed in such a pattern that the moving speed is high at intermediate region of the movement but is low at both end regions of the movement. This speed changing pattern is necessary for allowing the supply film roll 47 to be moved into and out of the film drum, as will be understood from the following description.

Referring to FIG. 4, as the main shaft 72 is rotated clockwise, the head crank arm 91 rotates so that the swing arm crank 71 fixed to the same shaft as the head crank arm 91 also rotates. The arrangement is such that, the swing arm crank 71 is in the position shown in FIG. 5 when the head crank arm 91 is in the position shown in FIG. 4. Therefore, the swing crank arm 71 is in the position shown in FIG. 7 when the head crank arm 91 has been moved to the position shown in FIG. 6. As stated before, the rotation of the swing arm crank 71 causes the supply film roll 47 to be extracted from the film drum by the motion of the swing arms 60. More specifically, when the swing arm crank 71 has reached the position shown in FIG. 7, the supply film roll 47 is extracted by the swing arms to the position shown in FIG. 6. It will be seen that the extraction of the supply film roll 47 is never hindered by the thermal head 47, because the thermal head 85 is not substantially moved upward despite the rotation of the head crank arm 91. Thus, as shown in FIG. 8, the thermal head 85 is moved upward only after the supply film roll 47 is moved to the right position past the position above the thermal head 85. FIG. 8 shows the state in which the supply film roll has reached its stroke end. Thus, in the states shown in FIGS. 8 to 10, the supply film roll has been moved to its stroke end away from the passage of the thermal head 85, so that the thermal head 85 can quickly move to the position shown in FIG. 10 where it is pressed onto the platen 79.

Conversely, when the main shaft 72 rotates counterclockwise, the thermal head is moved downward across the path of the supply film roll 47 and then thereafter the supply film roll 47 is moved to the left so as to be received in the film drum.

It is thus possible to move the supply film roll 47 into and out of the film drum without being interferred by the thermal head 85, thus realizing an easy setting of the film cassette of the desired color.

In the state shown in FIG. 10 in which the thermal head 85 is pressed onto the platen 79, the crankshaft 92 is disposed on the right side of the line interconnecting the head pin 90 and the main shaft 72. When the crankshaft is in this position, the reactional force produced as a result of the pressing of the thermal head 85 onto the platen 79 and the force of the helical spring 78 act on the head crank arm 91 tending to rotate the latter clockwise. In this state, the pressing projection 75 on the swing arm crank 71 fixed to the main shaft 72 abuts the left side surface of the swing arm 60 so as to prevent the main shaft 72 from further rotating clockwise. In this state, therefore, the thermal head 85 is held in pressure contact with the platen 79 and never comes off the platen 79.

When the thermal head 85 is pressed onto the platen 79, the head pin 90 through which the thermal head 85 is driven is not moved substantially in the vertical direction because the crankshaft 92 of the head crank arm 91 is almost in the top dead center. Therefore, the pressing of the thermal head 85 onto the platen 79 is effected in a very soft manner without substantial impact. For the same reason, the film 48 of the film cassette is pressed onto the platen 79 by the thermal head very slowly, so that the risk of damage of the film is eliminated.

Since the thermal head 85 and the associated parts are connected to the head crank arm 91 through the connector means, the force with which the thermal head is pressed onto the platen 79 is kept substantially constant even if there is any error or deviation in positions such as the position at which the head crank arm 91 is stopped as shown in FIG. 10 and position of mounting of the platen 79, and in the assembly of the thermal head driving mechanism.

Figure 12:
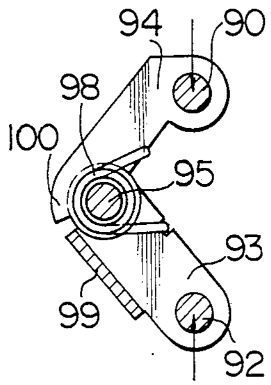
FIGS. 12 and 13 are enlarged views of a connector means illustrating the operation thereof.
Figure 13:
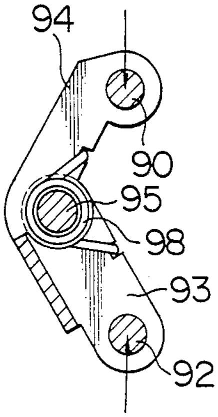
Figure 14:
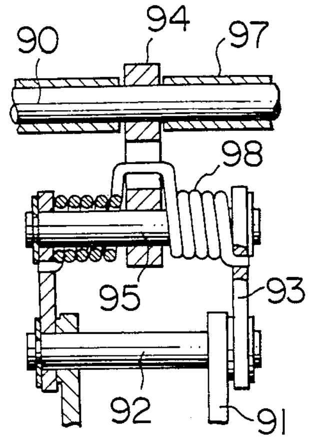
FIG. 14 is an enlarged front elevational view of the connector means.

More specifically, as shown in FIGS. 12, 13 and 14, the connector means is constituted by the connecting rod A, connecting rod B, connector shaft 98 and the connector helical spring 98. When an upward force is applied to the crankshaft 92, the reactional force produced by the head touch, i.e., the pressing of the thermal head 85 onto the platen 79, acts on the head pin so as to press the latter downward as indicated by an arrow. In consequence, the connecting rods A and B rotate about the connector shaft 95 against the connector helical spring 98 such that the angle formed therebetween is decreased. The connecting rods A and B in this state are shown in FIG. 12. As will be seen from this Figure, the stopper 99 of the connecting rod A and the stopper 100 of the connecting rod B are spaced from each other. The tendency as shown in FIG. 12, i.e., the movement of the connecting rods A and B toward each other to decrease the angle formed therebetween, is observed also in the state shown in FIG. 10 in which the thermal head 85 is pressed onto the platen 79, although the amount of reduction in the angle is comparatively small.

The change in the amount of reduction in the angle formed between the connecting rods A and B does not cause any substantial change in the force with which the thermal head 85 is pressed onto the platen 79. Namely, as the amount of reduction in the angle between the connecting rods A and B is decreased, the reactional force of the connector helical spring is increased. However, the decrease in the angle causes the connecting rods A and B to progressively lay horizontally. In consequence, the mechanism for pressing the thermal head 85 onto the platen 79 exerts a substantially constant force.

It is, therefore, possible to obtain a uniform quality of the transfer despite any fluctuation in the precision of assembly, thanks to the uniform level of the force with which the thermal head 85 is pressed onto the platen 79.

The auxiliary rollers A and B on the platen 79, which were mentioned before, are carried for rotation by supporting members 101 and 102 as shown in FIG. 19. The supporting members 101 and 102 are rotatably held by supporting pins 103 which are provided on the left side plate 6 and the right side plate 7 of the supporting frame. A tension spring 104 stretched between the ends of the supporting member 101 and 102 urge these ends toward each other, thus pressing the auxiliary rollers A and B onto the platen 79.

A description will be made hereinunder as to the arrangement for driving the take-up film roll 46.

Figure 6:
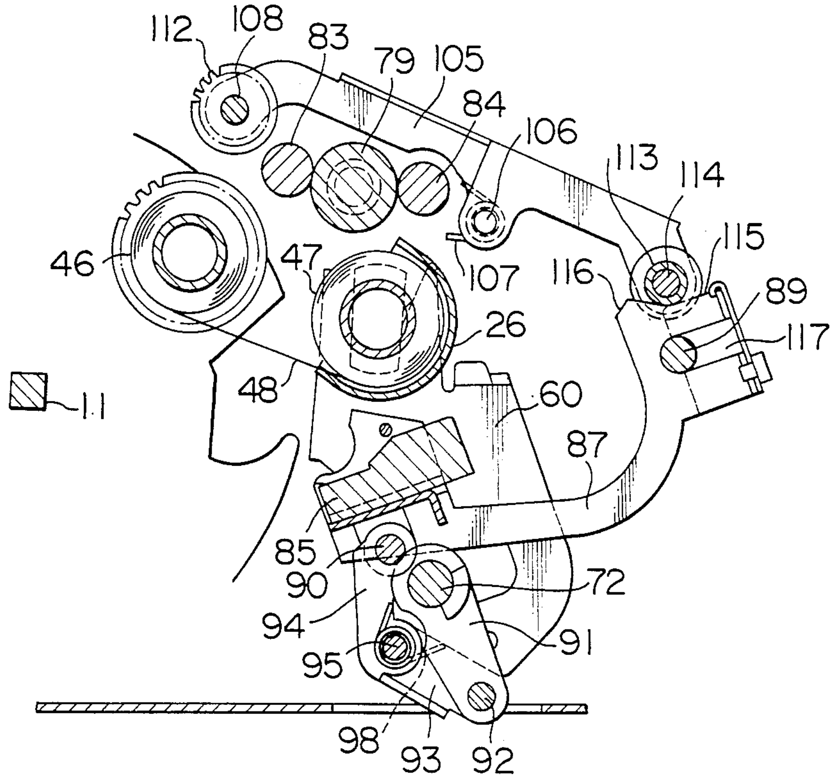
FIG. 6 is an illustration of operation of a thermal head, supply film roll and a traction lever incorporated in the printer.

As shown in Figures, particularly in FIGS. 4, 6 and 8, traction levers 105 are rotatably supported by support shafts 106 provided on the left side plate 6 and the right side plate 7. Each traction lever 105 is urged clockwise by a helical spring 107 wound on the support shaft 106. As will be understood from FIG. 2, a drive shaft 108 is rotatably supported at its both ends by the ends of the traction levers 105. A traction gear 109 is fixed to the drive shaft 108 as shown in FIG. 3. This traction gear 109, although not shown in FIG. 2, is attached to the right end of the drive shaft 108, and is held in meshing engagement with a platen gear 110 as shown in FIG. 3. The right side plate 7 is provided with an elongated hole 111 through which the drive shaft 108 is extended. Thus, the range of movement of the traction lever 105 about the supporting shaft 106 is limited by the elongated hole 111. The traction gear 109, which is movable within the range limited by the elongated hole 111, is always held in meshing engagement with the platen gear 110. As shown in FIG. 2, a drive gear 112 is fixed to and carried by the drive shaft 108. Although not shown in FIG. 2, another drive gear 112 is fixed to the right end of the drive shaft 108. Both drive gears 112 are disposed on the outer sides of the take-up gears 18, 18 so as to face these gears. As shown in FIG. 4, cam followers 113 are provided on the rear ends of the traction levers 105. More specifically, the cam followers 113 are fitted on shafts 114 which in turn are fixed to respective traction levers 105. Cams 115 are formed on the base portions of the head arms 87. Each cam 115 is provided at its left portion with a push-up cams 116. In order to prevent the head arm 89 to come off the head arm shaft 89, a head arm stopper 117 is secured to the base portion of the head arm 89 by means of a screw.

As will be seen from FIG. 4, when the thermal head 85 is in the lower position, the cam follower 113 on the traction lever 105 is held in contact with the cam 115 of the head arm 89, so that the drive gear 112 is kept away from the take-up gear 18. However, when the thermal head 85 is in the upper position shown in FIG. 10 in contact with the platen 79, the push-up cam portion 116 of the head arm 89 contacts the cam follower 113, so that the traction lever 105 is rotated about the supporting shaft 106 such that its right end if raised, while the left end of the same is lowered to bring the drive gear 112 into engagement with the take-up gear 18.

Thus, the take-up film roll 46 is drivingly connected to the platen gear 110 through the take-up gear 18, drive gear 112, drive shaft 108 and the traction gear 109. Therefore, the take-up film roll 46 rotates in accordance with the rotation of the platen 79 allowing a slip of the friction plate 24 so as to take-up the film 48 coming from the nip between the platen 79 and the thermal head 85 with a constant frictional torque. As in the case of the supply film roll 47, the diameter of the film on the take-up film roll changes progressively, so that the amount of rotation of the take-up film roll necessary for taking up the film is changed also. Therefore, the gear ratio of the transmission system for transmitting the torque to the take-up gear 18 is selected such that the take-up gear 18 is over-driven so as to cause a slip of the friction late 24, regardless of the diameter of the take-up film roll 46.

A description will be made hereinunder as to the driving system. As shown in FIGS. 2 and 3, a motor 118 for the platen is mounted on the right side plate 7 of the supporting frame through a base 119 attached to the right side plate 7. The motor 118 has a pinion 120 on its output shaft. A two-stage gear 121 is disposed on one side of the pinion 120. The two-stage gear 121 is rotatably supported on the right side plate 7, with its large gear held in meshing engagement with the pinion 120. The platen gear 110 is fixed to and carried by the right end of the platen shaft 80. A large gear of the platen gear 110 meshes with the small gear of the two-stage gear 121. An intermediate gear 122 is disposed on one side of the platen gear 110. The intermediate gear 122 is rotatably carried by a gear support 123 attached to the right side plate 7 and is held in meshing engagement with the small gear portion of the platen gear 110. A paper discharge roller shaft 124 is rotatably held at its both ends by the gear support 123. The paper discharge roller shaft 124 has a paper discharge roller 125. A paper discharge roller gear 126 is fixed to and held by the right end portion of the paper discharge roller shaft 124. The paper discharge roller gear 126 meshes with the intermediate gear 122.

The driving system for driving the platen 79 has the construction described above. As the motor 118 rotates, the platen 79 and the paper discharge roller 125 are driven through the gears mentioned above. At the same time, the take-up film roll 46 is rotated with a slip of the friction plate 24, on condition that the drive gear 112 meshes with the take-up gear 18, i.e., only when the thermal head 85 is pressed onto the platen 79.

Figure 23:
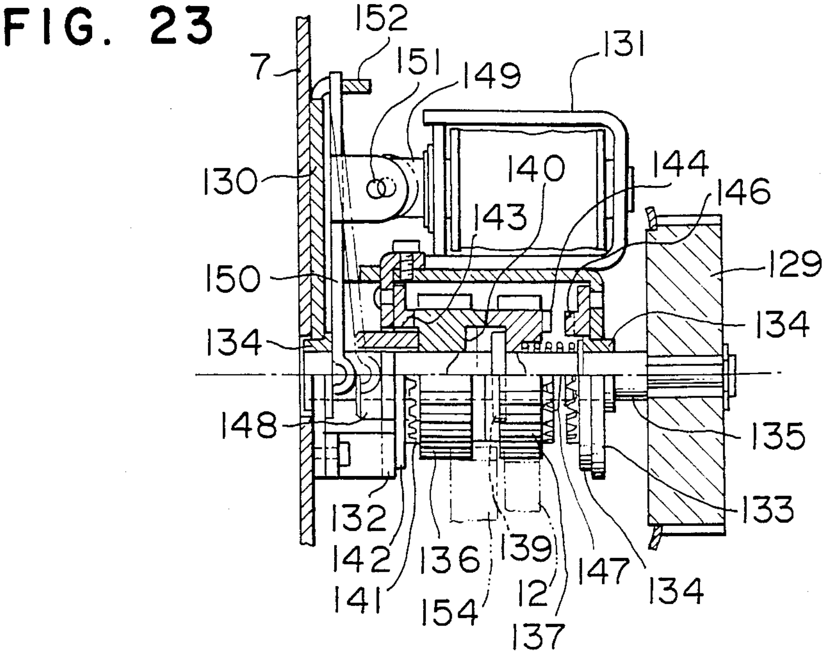
FIG. 23 is a sectional view of a clutch.
Figure 24:
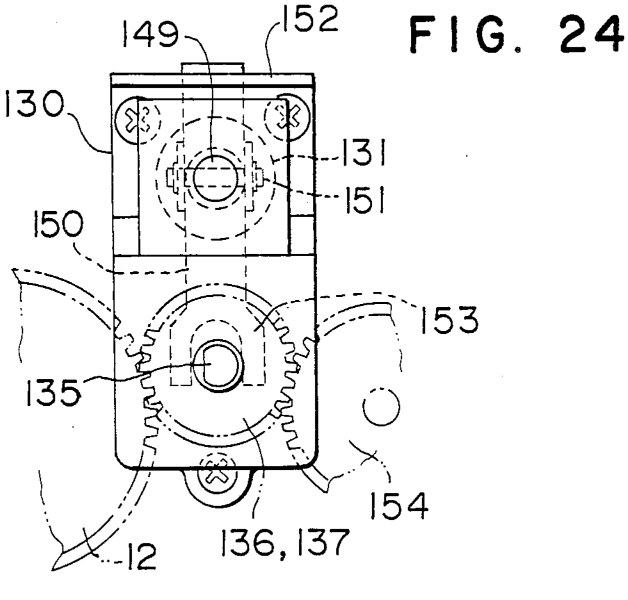
FIG. 24 is a front elevational view of the clutch.

The systems for driving the film drum and the thermal head are as follows. Referring to FIG. 3, the motor 127 adjacent to the film drum is mounted on the right side plate 7. A motor pulley 128 of the motor 127 and a clutch pulley 129 are drivingly connected to each other through a timing belt 129'. A clutch including the clutch pulley 129 have a construction as shown in FIGS. 23 and 24.

More specifically, a base plate 130 is attached to the right side plate 7. A bottom plate 132 is secured to the base plate 130 and a clutch support plate 133 by means of screws. The clutch support plate 133 also is secured to the base plate 130 by means of screws. Pulley shaft bearings 134 are attached to the base plate 130 and the clutch support plate 133. Both pulley shaft bearings 134 rotatably carry a pulley shaft 135. The clutch pulley 129 mentioned before is attached to the end of the pulley shaft 135. The pulley shaft 135 rotatably carries an idle clutch gear 136 and a drum clutch gear 137. The idle clutch gear 136 and the drum clutch gear 137 are allowed to slide along the pulley shaft 135 in the axial direction of the latter.

Grooves 140 engageable with a pin 139 are formed in the opposing surfaces of the idle clutch gear 136 and the drum clutch gear 137. Ratchet teeth 141 are formed in the left surface of the idle clutch gear 136. A fixed ratchet plate 142 is fixed to the right surface of the bottom plate 132 by means of rivets. Fixed ratchet teeth 143 are formed on the fixed ratchet plate 142. The ratchet teeth 141 on the idle clutch gear 136 are engageable with the fixed ratchet teeth 143.

Ratchet teeth 144 are formed on the right surface of the drum clutch 137. A fixed ratchet plate 145 is fixed to the left surface of the clutch support plate 133 by means of rivets. The fixed ratchet plate 145 is provided with fixed ratchet teeth 146 formed thereon.

A clutch spring 147 is disposed between the drum clutch 137 and the pulley shaft 134. The clutch spring 147 is fitted around the pulley shaft 135. The clutch spring 147 urges the drum clutch gear 137 and the idle clutch gear 136 to the left, so that the ratchet teeth 141 of the idle clutch gear 136 engage with the fixed ratchet teeth 143 of the fixed ratchet plate 142. Simultaneously, the pin 139 of the pulley shaft 135 is disengaged from the groove 140 in the idle clutch gear 136 and is brought into engagement with the groove 140 in the drum clutch gear 136. At the same time, the ratchet teeth 144 of the drum clutch gear 137 are disengaged from the stationary ratchet teeth 146 of the stationary ratchet plate 145. In this state, the pulley shaft 135 is drivingly connected to the drum clutch gear 137 through the pin 139, while the idle clutch gear 136 is free from the pulley shaft 135.

A pressing cylinder 148 is disposed on the left side of the idle clutch gear 136. The pressing cylinder 148 is fitted on the pulley shaft 135. A solenoid 131 has a plunger shaft 149 to which a lever 150 is connected through a pin 151. The lever 150 is retained by a retainer portion 152 of the base plate 130. As will be seen from FIG. 24, the end of the lever 150 is bifurcated as denoted by 153 such that the pulley shaft 135 is disposed between two branches of the bifurcated end 153. The end of each branches of the bifurcated end 153 is provided with an end bent in a form like U so as to contact the left surface of the pressing cylinder 148.

The idle clutch gear 136 engages with an idle gear 154, while the drum clutch gear 137 engages with the drum gear 12. The idle gear 154 is rotatably supported by the right side plate 7 of the supporting frame, and is held in meshing engagement with the main gear 77 which is supported by the right end of the main shaft 72.

When the motor 127 for the film drum operates while the solenoid 131 is not energized, the output rotation of the motor 127 is transmitted to the clutch pulley 129 through the timing belt 129', and then to the drum gear 12 through the drum clutch gear 137, thus driving the film drum to the position at which the film cassette of the color necessary for the transfer can be taken out.

Then, as the solenoid 131 is energized, the plunger shaft 149 is attracted so that the lever 150 is moved to the position show by chain line in FIG. 23. In consequence, the pressing cylinder 148 pushes the idle clutch gear 136 and the drum clutch gear 137 to the right against the force of the clutch spring 147, so that the ratchet teeth of the drum clutch gear 137 are brought into engagement with the ratchet teeth 146 of the fixed clutch plate 145, thus holding the drum clutch gear 137. On the other hand, the idle clutch gear 136 is released and the pin 139 of the pulley shaft 135 is brought into engagement with the groove in the idle clutch gear 136 so that the pulley shaft 135 and the idle clutch 136 are drivingly connected to each other. Consequently, the rotation of the output shaft of the motor 127 is transmitted to the idle clutch gear 137. As a result, the main gear 77 is driven through the idle clutch gear 137, whereby the main shaft 72 is rotated. As the main shaft 72 rotates, the swing arms 60 are swung as described before, so that the supply film roll 47 is extracted from the film drum and delivered to the supply roll external support 56. Simultaneously with the extraction of the supply film roll 47, the head crank arm 91 is rotated so as to press the thermal head 85 onto the platen 79. In order to return the supply film roll 47 and the thermal head 85, the motor 127 is reversed. When they are returned to the initial positions, the rear end upper surface of the film lock lever 52 is pressed by the lock lever engaging pin 78 of the main gear 77. In consequence, the film drum is released and become ready for extraction from the printer main part 1.

An explanation will be made hereinunder as to the position control performed in connection with the rotation of the film drum, vertical movement of the thermal head and the extraction of the film roll.

The description will be made first in regard to the vertical movement of the thermal head and the extraction of the supply film roll.

Figure 25:
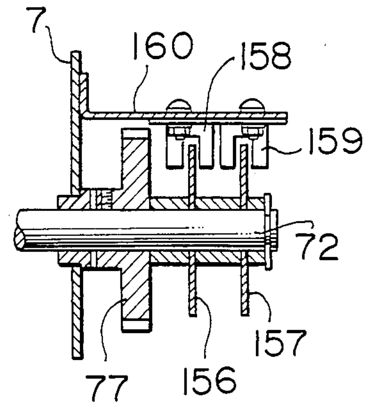
FIG. 25 is a sectional view showing a sensor for sensing the rotational position of a main shaft and parts around the sensor.
Figure 26:
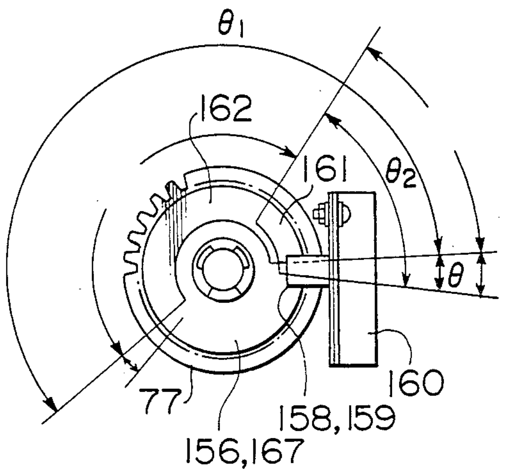
FIG. 26 is a front elevational view of a portion around the sensor.
Figure 30:
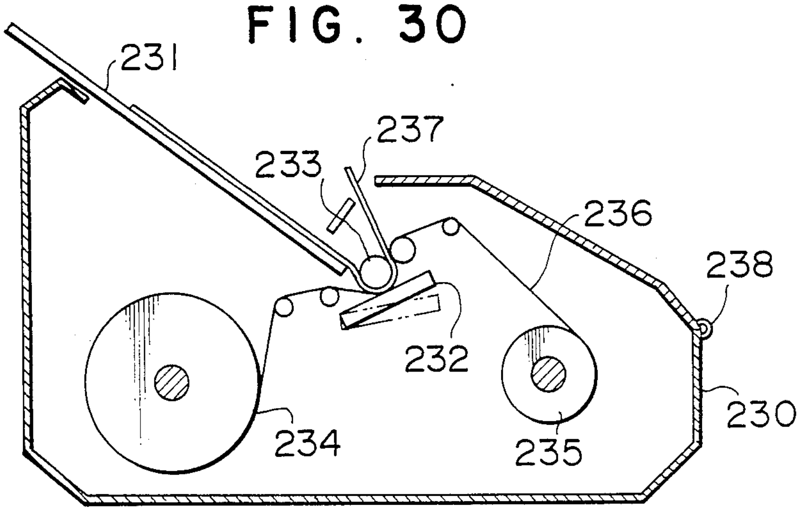
FIG. 30 is a sectional view of a known thermal printer.

As shown in FIGS. 25 and 26, two shield plates 156, 157 on the right side of the main gear 77 are fixed to the main shaft 72. A sensor 158 associated with the shield plate 156 and a sensor 159 associated with the shield plate 157 are attached to a sensor base 160 which in turn is secured to the right side plate 7. A window 161 is formed in the shield plate 157. The window 161 extends through an angle $\theta_2$. A window 162 is formed in the shield plate 156. The window 162 extends through an angle $\theta_1$. The state in which the light input to the sensor is shielded by the shield plate will be referred to as OFF state, while the state in which the light input to the sensor is not shielded by the shield plate will be referred to as ON state. The shield plates 156 and 157 rotate within the range between positions marked by (a) and (d). When the shield plates 156 and 157 are in the position (a), the sensor 159 is in the ON state, while the sensor 158 is in the OFF state. When the shield plates are in the position (b), both the sensors 159 and 158 are ON. In the position (c), the sensor 159 is OFF, while the sensor 158 is ON. In the position (d), both the sensors 159 and 158 are OFF.

When the shield plates are in the position (a), the thermal head 85 is in the lowermost stroke end thereof. Thus, this position corresponds to the state in which the supply film roll 47 is in the film drum. The position (d) corresponds to the state in which the thermal head 85 is raised only slightly and the supply film roll begins to move and reach its stroke end. In the transient period between the state corresponding to the point (b) and a point (c), the transfer is not conducted so that the film is kept away from the transfer paper so that the transfer sheet solely is fed while the film remains unmoved, thus eliminating any waste of the film. This motion is generally referred to as skipping. The position (c) corresponds to a period in which the thermal head 85 is raised significantly and is just going to be pressed onto the platen 79. The position (d) corresponds to the state in which the thermal head 85 has been pressed onto the platen 79.

The states of the sensors in relation to the movement of the thermal head and the supply film roll are summarized in the following Table.

| position | sensor 159 | sensor 158 | thermal head | supply film roll |
|---|---|---|---|---|
| a | ON | OFF | lower end | on film drum |
| b | ON | ON | slightly raised and reach intermediate position | slightly move out of film drum and pass stroke end (comes out completely) |
| c | OFF | . . . ON | intermediate position (skip position) to immediately . . . before pressing position | completely out of film drum |
| d | OFF | OFF | pressed to platen | completely out of film drum |

-continued

The vertical movement of the thermal head, movement of the supply film roll and the operation of the motor 127 for effecting the skip are controlled in accordance with the outputs from the sensors 158, 159.

A description will be made hereinunder as to the film drum.

Figure 27:
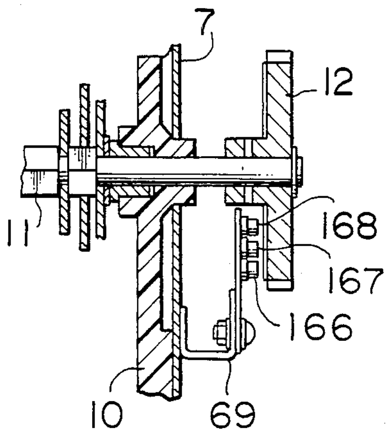
FIG. 27 is a sectional view of a portion of the printer around a sensor for sensing the position of the film drum.
Figure 28:
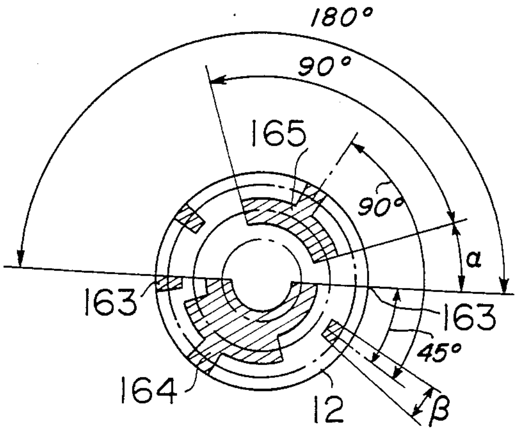
FIG. 28 is an illustration of a reflector plate.
Figure 29:
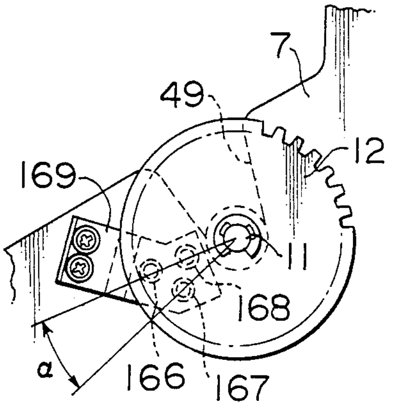
FIG. 29 is a sectional view of a portion of the printer around a sensor for sensing the position of the film drum.

As shown in FIGS. 27, 28 and 29, reflector plates 163, 164 and 165 are provided on the side surface of the drum gear 12. Sensors 166, 167 and 168 are provided on a sensor base 169 which in turn is supported by the side plate 7. Three sensors 166, 167 and 168 oppose to the reflector plates 163, 164 and 165, respectively. Thus, the confirmation of the position is conducted by detecting the reflection from the reflector plates 163, 164, 165 and the sequence of the reflection. By determining beforehand the positions for receiving the film cassettes of four colors, it is possible to take-out the film cassette of the desired color without fail and to return the same to the right position.

A description will be made hereinunder as to the paper feeding device 2.

Figure 22:
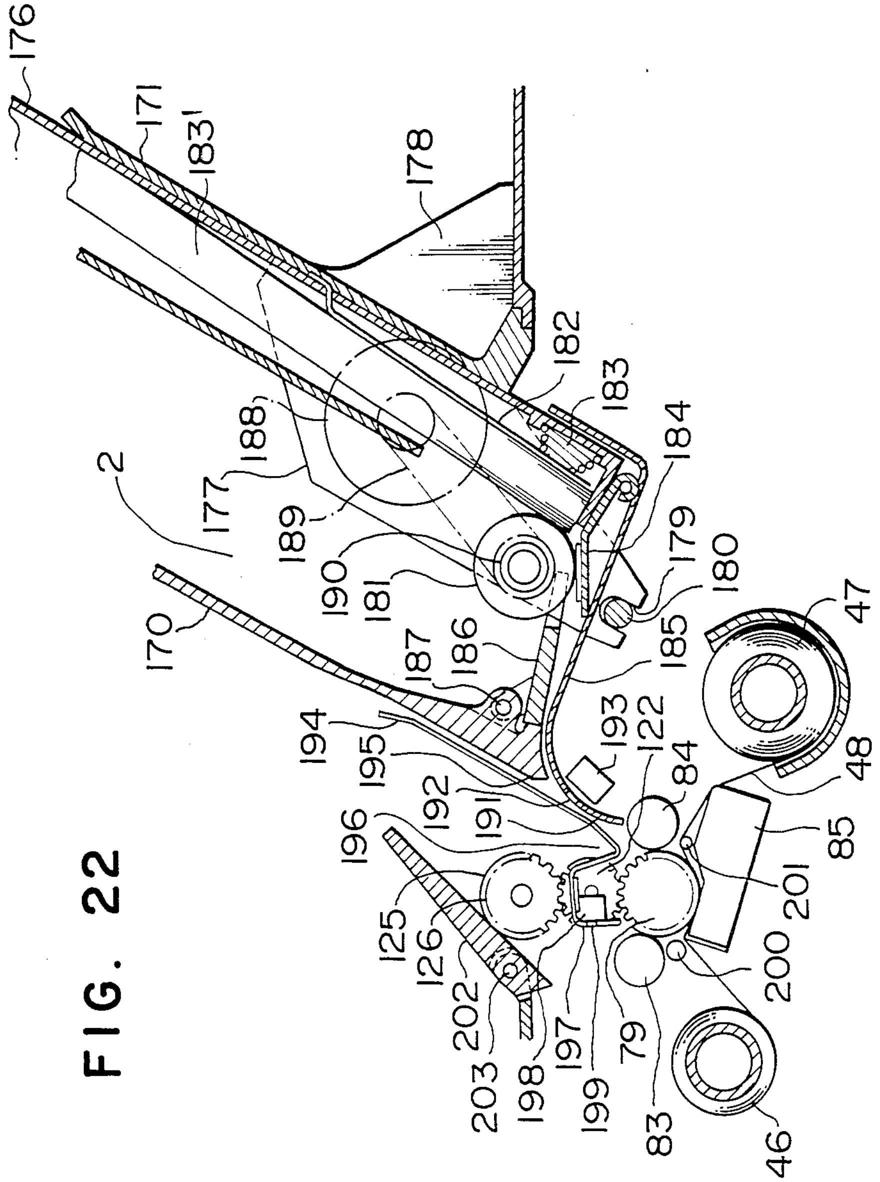
FIG. 22 is an enlarged view showing the arrangement of the paper feed and discharge device, platen and the thermal head.

As shown in FIGS. 1, 3 and 22, an automatic paper feeding device 171 is disposed behind a manual feeding tray 170. The automatic paper feeding device 171 is detachably attached to the rear surface of the manual paper feeding tray. A pair of receptacle side plates 172 are provided on the rear surface of the paper feeding tray 170. A bottom plate 173 is provided on the rear side thereof with upwardly bent rear wall 174. The rear wall 174 is secured to the left and right side plates 6, 7 by means of screws 175. The portion of the rear wall 174 constituting the bottom plate 173 is fixed to the left and right side plates 6 and 7 by means of screws 175'. Thus, the receptacle side plates 172, bottom plate 173 and the rear wall 174 form on the rear surface of the manual feeding tray 170 a receptacle for receiving the automatic paper feeding device 171.

The automatic paper feeding device 171 has receptacle side plates 177. Supporting legs 178 are formed on the rear side of the automatic paper feeding device 171. A receiving groove 179 is formed in the lower end of each receiving side plate 177. The arrangement is such that, as the automatic paper feeding device 171 is inserted into the receptacle, the receiving grooves 179 in the receptacle side plates 177 receive the supporting bar 180. At the same time, the supporting legs 178 are born by an upper portion of the upper outer case 3, whereby the supporting legs 178 are supported by the printer main part 1. The receptacle side plates 177 carry an automatic paper feeding roller 181. A push-up plate 182 is disposed in the case 176 near the bottom, so as to be pushed up by a push-up spring 183. A sheet of paper 183' received in the case 176 is pressed onto the automatic paper feeding roller 181 with the force exerted by the push-up spring 183.

An automatic paper separator 184, which contacts the lower peripheral portion of the automatic paper feeding roller 181, is disposed in the automatic paper feeding device 171. On the other hand, the bottom plate 173 which is a constituent of the receiving portion is provided with an automatic paper feeding lower guide 185. An automatic paper feeding upper guide 186 is disposed so as to oppose the upper surface of the lower guide 185. The automatic paper feeding upper guide 186 is supported on a lower portion of the rear surface of the manual paper feeding tray 170 through a support shaft 187. A paper feeding motor 188 is secured to the receptacle side plates 177. The paper feeding motor 188 is adapted to drive the automatic paper feeding motor 181 through a belt 189. The automatic paper feeding roller 181 is provided with a one-way clutch 190 so that it can rotate only in the direction for feeding the paper. When the motor is reversed, the one-way clutch 190 slips so that the automatic paper feeding roller 181 is never driven. As the automatic paper feeding roller 181 rotates, the paper 183' in the case 176 is fed towards the automatic paper feeding separator 184. In the event that two sheets of paper are fed, only the upper sheet is passed to the gap between the automatic paper feeding upper and lower guides 186, 185. The other sheet is sent next time.

The left end portion of the automatic paper feeding lower guide 185 is curved downward so as to extend towards the area of contact between the platen 79 and the auxiliary roller 84. This curved portion 191 has a window 192 formed therein. A paper feeding sensor 193 is provided on the rear surface of the window 192.

A paper guide 194 is disposed on the lower side of the surface of the manual paper feeding tray 170 leaving a small gap therebetween. The paper guide 194 extends towards the area of contact between the platen 79 and the auxiliary roller 84. This extension of the paper guide faces the bent portion 191 of the automatic paper feeding lower guide 185 across a small gap.

The paper sheet fed from the automatic paper feeding device 171 or from the manual paper feeding tray 170 is introduced into the nip between the platen 79 and the auxiliary roller 84 through the curved portion 191 and the extension of the paper guide 194. A tapered surface 195 is formed on the lower corner of the manual paper feeding tray 170. This tapered surface 195 is intended for preventing the paper sheet from erroneously fed back to the automatic paper feeding device 171 after returned through the gap between the bent portion 191 and the extension in multi-color printing operation which will be explained later.

The extension of the paper guide 194 is provided in the lower end thereof with a V-shaped paper guide pocket 196. A paper sensor plate 197 is fixed to an upper portion of the paper guide pocket 196. A paper sensor 198 is attached to the paper sensor plate 197. A window 199 for the paper sensor 198 is formed in the paper sensor plate 197.

A paper guide bar 200 is disposed slightly below the area of contact between the platen 79 and the auxiliary roller 83. On the other hand, a film guide bar 201 is disposed slightly below the area of contact between the platen 79 and the auxiliary roller 84. The film guide bar 201 has to be supported at least by the structure associated with the thermal head 85.

A paper discharge plate 202 is held in contact with the upper outer peripheral portion of the paper discharge roller 125. The paper discharge plate 202 is rotatably supported by the outer case 3 through a support shaft 203.

The transfer operation of the printer will be explained hereinunder. As a paper sheet is fed by the automatic paper feeding device or from the manual paper feeding tray 170, the leading edge of the paper sheet is moved along the curved portion 191 and is stopped by the entrance to the nip between the platen 79 and the auxiliary roller 84. The passage of the paper feeding sensor 193 is sensed by the paper sensor 193 so that the motor 118 of the platen driving system is started. In consequence, the platen 79, auxiliary rollers A, B, paper discharge roller 125 and the take-up film roll 46 rotate, so that the paper sheet passes through the nip between the platen 79 and the film 48. The leading end of the paper sheet is then deflected by the upper side of the paper guide bar and is introduced into the nip between the platen 79 and the auxiliary roller 83. The leading end of the paper sheet is then moved upward along the paper sensor plate 197 so as to reach the window 199, so that the paper sensor 198 detects that the paper sheet has reached the position where the ink can be transferred. Upon detection of this state, a transfer signal is supplied to the thermal head 85 so that the thermal head produces heat in accordance with the signal, thereby transferring the ink from the film to the paper sheet. After the transfer, the film 48 is moved to the left together with the paper, whereby the information is printed successively. The paper sheet is then pushed so as to pass through the gap between the paper discharging roller 125 and the paper discharging plate 202. After the completion of the transfer, the paper sheet drops into a paper guide pocket 196 so as to be stored in the latter. The passage of the trailing end of the paper is detected by the paper sensor 198. The motor 118 is then stopped after elapse of a time which is beforehand set to enable the paper sheet to drop into the paper guide pocket 196, from the moment at which the passage of the trailing end of the paper sheet is detected by the paper sensor 198.

For the purpose of conducting multi-color printing, the paper sheet is reciprocatingly moved plurality of times through the nip between the platen 79 and the film 48. In this case, as explained before, the film cassette is changed each time the transfer color is to be changed. Preferably, the reciprocatory movement of the paper sheet is conducted in such a manner that the trailing end portion of the paper sheet does not come off the nip between the platen 79 and the auxiliary roller 83 and that the leading end portion of the paper sheet does not come off the nip between the platen 79 and the auxiliary roller 84. The paper feed sensor 193 and the paper sensor 198 are effectively utilized for realizing such a reciprocatory movement of the paper sheet.

Although the described embodiment of the invention employs four colors, i.e., black, yellow, magenta and cyan, this is not exclusive and other types of inks can be used equally well. For instance, it is possible to replace one or more of the films of these colors with special film or films such as a multi-strike ink film, an ink film suited to rough paper surface or a special ink film capable of providing a high grade of color tone, thus adapting the printer to various specific uses. The change-over from the standard printing mode to the special printing mode for such specific uses can be conducted automatically.

As has been described, according to the invention, the distance between both rolls of the film is decreased when the film is to be mounted and demounted, whereas, when the printing is to be conducted, the distance between both rolls is increases so as to press the film portion between both rolls onto the transfer paper. This arrangement conveniently facilitates the mounting and demounting of the film, while minimizing the risk for the film to be damaged.

What is claimed is:

1. A thermal transfer printer comprising a platen and a thermal head for transferring ink to a transfer paper sheet from an ink film by pinching a transfer paper sheet and an ink film between the platen and the thermal head so that the ink is transferred from said film to said transfer paper sheet as said film is heated by said thermal head, wherein said film is constituted by a take-up roll and a supply roll, means for arranging said platen and said thermal head such that they can be spaced from each other by an amount which is greater than the maximum diameter of either one of said rolls and for bringing said platen and thermal head together from said spaced position so as to pinch a portion of an ink film and a transfer paper sheet positioned therebetween, and means for mounting said film on said printer, said means for mounting including means for passing one of said rolls through the clearance between said platen and said thermal head when said platen and thermal head are in said spaced position so as to increase the distance between said rolls of said film and so as to lay said film whereby said platen and said thermal head can be brought together so as to pinch the portion of said film positioned therebetween together with said transfer paper sheet, and whereby, for demounting said film, said platen and said thermal head can be spaced from each other in said spaced position and said one of said rolls can be passed back through the clearance between said platen and said thermal head so as to decrease said distance between said rolls.

2. A thermal transfer printer according to claim 1, wherein said means for mounting includes a film drum which can hold said film with said distance between said rolls decreased.

3. A thermal transfer printer according to claim 2, wherein said film drum can hold a plurality of films each being constituted by said take-up film roll and said supply film roll.

4. A thermal transfer printer according to claim 1, further comprising control means for automatically causing increase and decrease of the distance between said rolls, movement of said thermal head toward and away from said platen, and movement of said one of said rolls to pass through said clearance between said platen and said thermal head.

* * * * *